US006631201B1

(12) United States Patent
Dickinson et al.

(10) Patent No.: US 6,631,201 B1
(45) Date of Patent: Oct. 7, 2003

(54) RELIEF OBJECT SENSOR ADAPTOR

(75) Inventors: Alexander G. Dickinson, Laguna Beach, CA (US); Brian Berger, Mission Viejo, CA (US); Andrew Cole, Palm Bay, FL (US)

(73) Assignee: Security First Corporation, Rancho Santa Margarita, CA (US)

(*) Notice: Subject to any disclaimer, the term of this patent is extended or adjusted under 35 U.S.C. 154(b) by 0 days.

(21) Appl. No.: 09/435,011

(22) Filed: Nov. 5, 1999

Related U.S. Application Data
(60) Provisional application No. 60/107,556, filed on Nov. 6, 1998.

(51) Int. Cl.[7] .................................................. G06K 9/00
(52) U.S. Cl. ....................................................... 382/124
(58) Field of Search ........................... 382/124; 340/5.31, 340/5.62, 5.83; 235/375, 380–382.5; 283/68, 69; 356/71

(56) References Cited

U.S. PATENT DOCUMENTS

| | | | | |
|---|---|---|---|---|
| 3,734,630 A | | 5/1973 | McIntosh et al. ............. 356/444 |
| 4,202,120 A | * | 5/1980 | Engel ............................ 283/69 |
| 4,438,824 A | | 3/1984 | Mueller-Schloer ........... 713/185 |
| 4,441,018 A | * | 4/1984 | Wessel .......................... 235/458 |
| 4,827,527 A | | 5/1989 | Morita et al. ................. 382/127 |
| 4,872,203 A | | 10/1989 | Asai et al. ....................... 383/4 |
| 4,995,086 A | | 2/1991 | Lilley et al. .................. 382/124 |
| 5,144,680 A | * | 9/1992 | Kobayashi et al. ............ 356/71 |
| 5,180,901 A | * | 1/1993 | Hiramatsu .................... 235/380 |
| 5,448,659 A | * | 9/1995 | Tsutsui et al. ................. 356/71 |
| 5,615,277 A | | 3/1997 | Hoffman ....................... 382/115 |
| 5,623,552 A | | 4/1997 | Lane ............................. 382/124 |
| 5,708,262 A | * | 1/1998 | Goldman et al. ......... 235/462.15 |
| 5,712,912 A | | 1/1998 | Tomko et al. ................. 713/186 |
| 5,740,276 A | | 4/1998 | Tomko et al. ................. 382/210 |
| 5,764,789 A | | 6/1998 | Pare, Jr. et al. ............... 382/115 |
| 5,768,382 A | | 6/1998 | Schneier et al. .............. 380/251 |
| 5,768,389 A | | 6/1998 | Ishii .............................. 380/30 |
| 5,790,674 A | | 8/1998 | Houvener et al. ............. 713/185 |
| 5,801,681 A | | 9/1998 | Sayag ........................... 345/157 |
| 5,802,199 A | | 9/1998 | Pare, Jr. et al. ............... 382/115 |
| 5,828,773 A | | 10/1998 | Setlak et al. .................. 382/126 |
| 5,832,464 A | | 11/1998 | Houvener et al. .............. 705/45 |
| 5,852,670 A | | 12/1998 | Setlak et al. .................. 382/126 |
| 5,864,296 A | | 1/1999 | Upton .......................... 340/5.53 |
| 5,869,822 A | | 2/1999 | Meadows, II et al. ........ 235/380 |
| 5,887,140 A | | 3/1999 | Itsumi et al. ................. 709/225 |
| 5,903,225 A | | 5/1999 | Schmitt et al. ............... 340/5.25 |
| 5,920,640 A | | 7/1999 | Salatino et al. ............... 382/124 |
| 5,974,162 A | * | 10/1999 | Metz et al. ................... 382/124 |
| 6,078,265 A | * | 6/2000 | Bonder et al. ............... 340/5.23 |
| 6,173,405 B1 | * | 1/2001 | Nagel ........................... 235/486 |
| 6,266,017 B1 | * | 7/2001 | Aldous ......................... 343/702 |
| 6,292,272 B1 | * | 9/2001 | Okauchi et al. .............. 348/552 |
| 6,343,945 B1 | * | 2/2002 | Liikanen ...................... 235/475 |

FOREIGN PATENT DOCUMENTS

| | | |
|---|---|---|
| DE | 29814427 | * 12/1998 |
| EP | 0 757 479 A2 | 8/1996 |
| WO | WO 95/22804 | 8/1995 |
| WO | WO 98/38567 | 9/1998 |

OTHER PUBLICATIONS

Gross Neil et al., Figerprints for Online Security, Business Week; New York; Jun. 8, 1998, 68.*

Copy of International Search Report dated Mar. 16, 2000 from corresponding PCT Application No. PCT/US99/26190.

* cited by examiner

*Primary Examiner*—Leo Boudreau
*Assistant Examiner*—Shefali Patel
(74) *Attorney, Agent, or Firm*—Steptoe & Johnson PLLC

(57) ABSTRACT

An interface card includes a housing sized for reception by a host system, for example, a laptop computer. A sensor is movably connected to the housing and has a first position in which the sensor receives a relief object and generates an electronic representation of the relief object, and a second position in which the sensor is inactive. An interface module is coupled to the sensor and configured to provide for communications between the interface card and the host system.

18 Claims, 27 Drawing Sheets

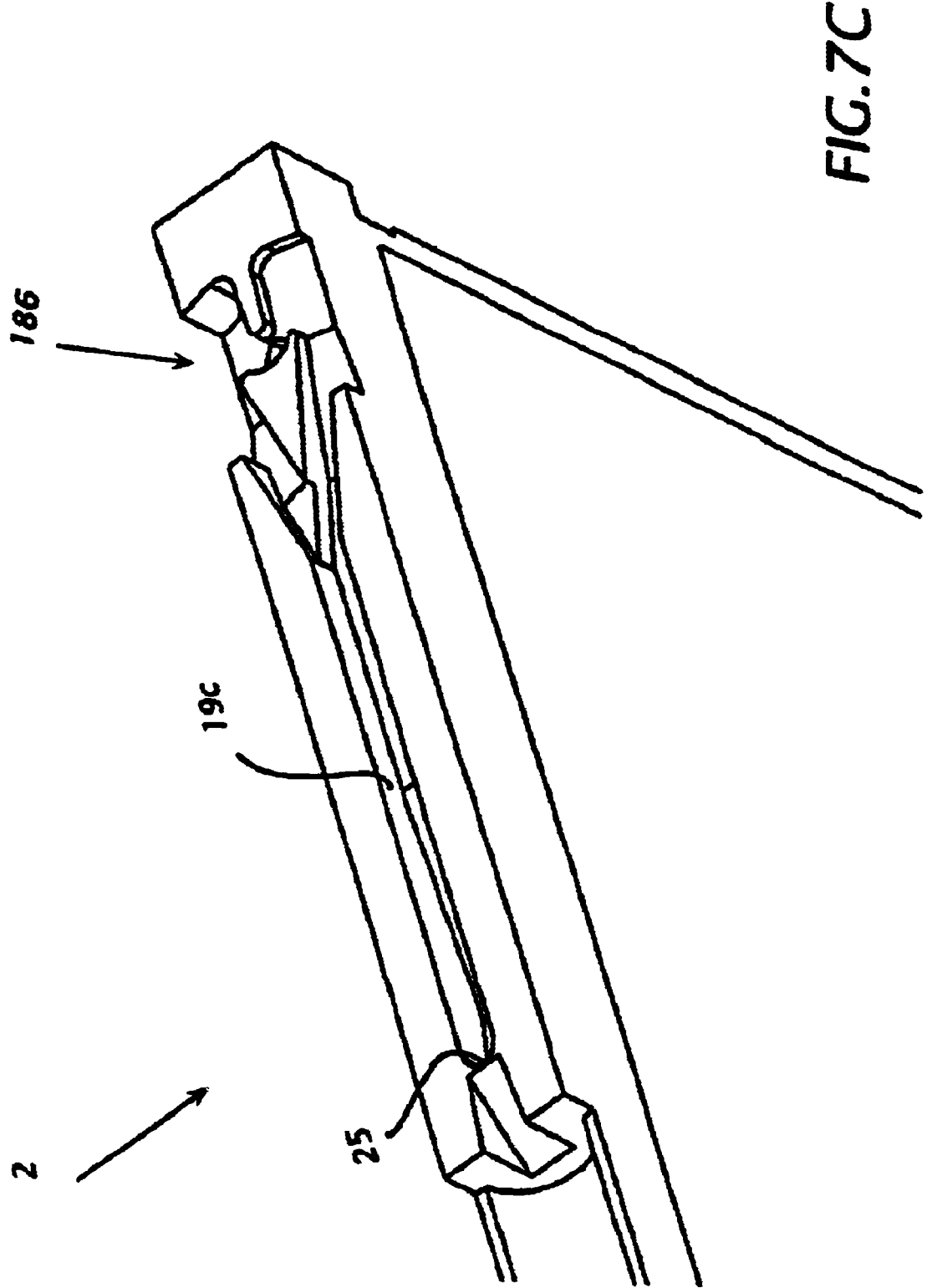

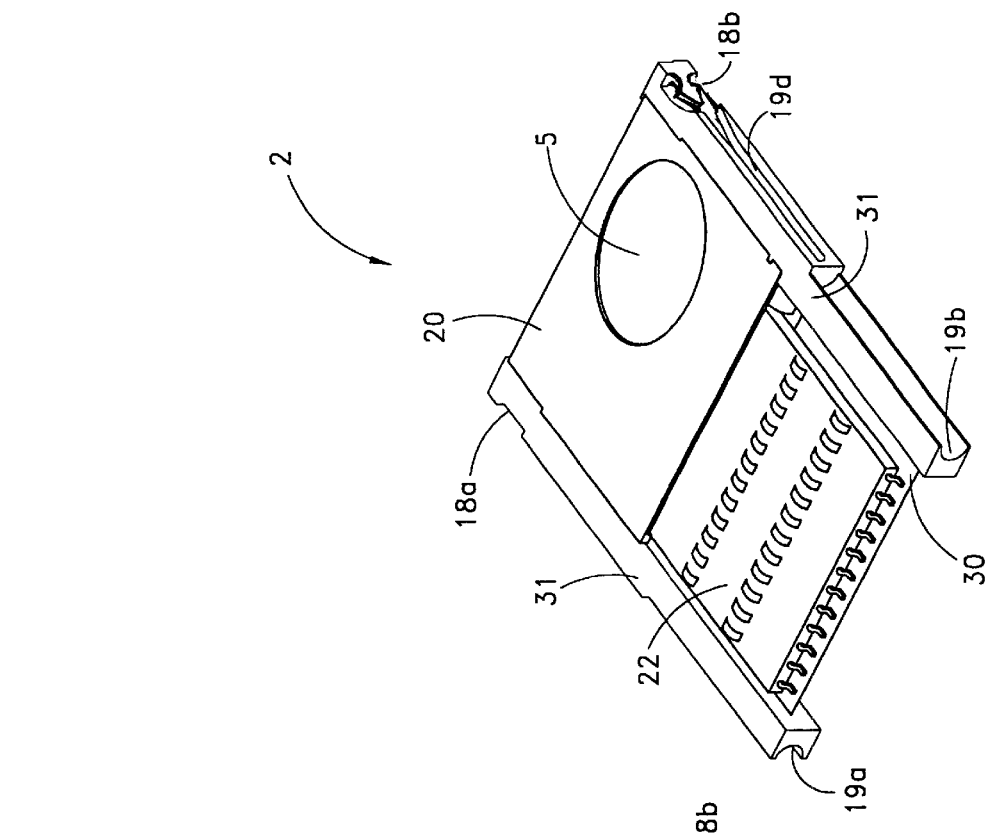
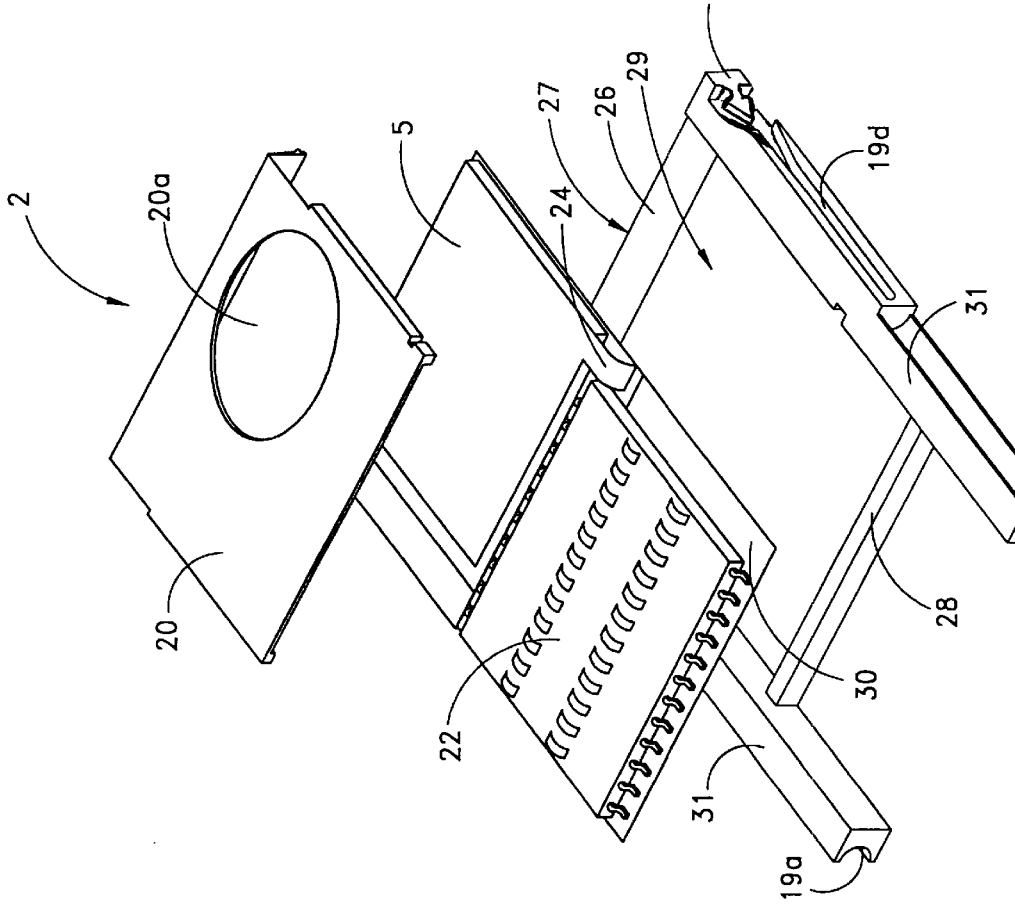
FIG. 8B
FIG. 8A

RELIEF OBJECT SENSOR ADAPTOR

RELATED APPLICATION

This application claims the benefit of priority under 35 U.S.C. 119(e) of U.S. Provisional Application No. 60/107,556, filed Nov. 6, 1998, which is herewith incorporated by reference herein.

BACKGROUND OF THE INVENTION

1. Field of the Invention

The invention relates to a method and apparatus for obtaining data relating to a relief object. More particularly, the invention relates to a device and an interface card that include a relief object sensor.

2. Description of the Related Art

The growth of personal computers and corporate networks, and their growing use for electronic commerce ("e-commerce"), for example, via the Internet, creates a need for easy and reliable identification of the users, who no longer meet face-to-face. When a vendor and a customer deal with each other via the Internet, both have a strong interest in reliably knowing the identity of the other party before, for example, the customer submits the credit card number or the vendor ships the ordered goods.

In addition, the increasing mobility of the users creates the need of protecting electronic devices, such as laptop computers and cellular phones, while a user is travelling. For example, the electronic devices can be lost or stolen. The user can prevent the finder or thief from using the electronic device with an electronic identification process.

Electronic identification processes are often used in e-commerce transactions and in protecting electronic devices. In one example of a widespread electronic identification process, the user has to input a password or a personal identification number (PIN) before the electronic device can be operated or before goods can be ordered from the vendor. However, passwords and PIN's are insecure, inconvenient and are expensive to maintain. For instance, given the choice, users tend to choose easily remembered and hence easily guessed passwords and PIN's.

An improved process for electronic identification uses biometric security devices that use a variety of human characteristics to identify the user. These characteristics include fingerprints, palm prints, voice, face, and retinal patterns, and the like. The biometric security devices may be installed in access-restricted locations where high-level security is needed. In addition to such permanently installed biometric security devices, the biometeric devices may be individual devices that are connectable to a computer via a cable if needed.

One example of a biometric security device is a contact sensor, such as a fingerprint sensor used to identify or authorize a user. The fingerprint sensor generates an electronic representation or image of the tip of a finger which causes a fingerprint when placed on a surface. A matching algorithm compares the electronic representation of the present user's fingerprint with a stored electronic representation of the authorized user's fingerprint. If the representations match, the present user is identified as the authorized user.

Biometric characteristics may completely replace the use of passwords or PIN's, or may at least be used in combination with passwords and/or PIN's. Because of the potential widespread use, biometric devices must be reliable, convenient, easy to use, and portable.

SUMMARY OF THE INVENTION

An aspect of the invention involves a device having a housing that is compatible with a host system, and a sensor. The sensor is movably interconnected with the housing and has a first position in which the sensor receives an input and generates an electronic representation of the input. In a second position the sensor is inactive.

Another aspect of the invention involves a removable interface card for use in interfacing between a user and a host system. The interface card includes a housing that is compatible with the host system and has an upper rectangular surface and a lower rectangular surface spaced apart from the upper surface. The upper and lower surfaces extend along a longitudinal axis. A retractable carrier is coupled to the housing and has an active position in which the retractable carrier extends along the longitudinal axis and out from between the upper and lower surfaces. A sensor is supported by the retractable carrier and has an active surface which receives an input. The sensor is configured to generate an electronic representation of the input.

A further aspect of the invention involves a system having a host system and an interface card compatible with the host system. The interface card has a housing and a sensor movably interconnected with the housing. The sensor has a first position in which the sensor receives an input and generates an electronic representation of the input, and in addition a second position in which the sensor is inactive.

Another aspect of the invention involves a method of obtaining data. An interface card, which has a sensor movably connected within the interface card, is inserted into a reception port of a host system. The sensor is exposed so that a relief object can be placed on the sensor, and an electronic representation of the relief object located on the sensor is generated. The electronic representation is available for processing.

A further aspect of the invention involves a method of obtaining data. A sensor is moved from an inactive position into an active position in which the sensor is exposed to receive an input. The sensor is activated and generates an electronic representation of the input. The electronic representation is available for further processing.

An aspect of the invention involves an interface card that includes a sensor onto which a relief object can be placed. The sensor generally generates an electronic representation of the relief object. The relief object may be a structured-surface object such as a fingertip having a structure or pattern of ridges and valleys that represent a fingerprint. The sensor has an exposed position in which the user can place a finger on the sensor, and a retracted position in which the sensor disappears within the interface card. The interface card is about the size of a credit card and fits into a standard slot, for example, of a portable computer. Within the slot, the interface card connects to the portable computers.

For purposes of summarizing the invention, certain aspects, advantages and novel features of the invention have been described herein. Of course, it is to be understood that not necessarily all such aspects, advantages or features will be embodied in any particular embodiment of the invention.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

FIG. 7C shows an enlarged illustration of the latch mechanism.

FIG. 8A shows an exploded view of a sensor module of the interface card.

FIG. 8B is a perspective view of the sensor module.

DETAILED DESCRIPTION OF THE PREFERRED EMBODIMENT

Figure 1:
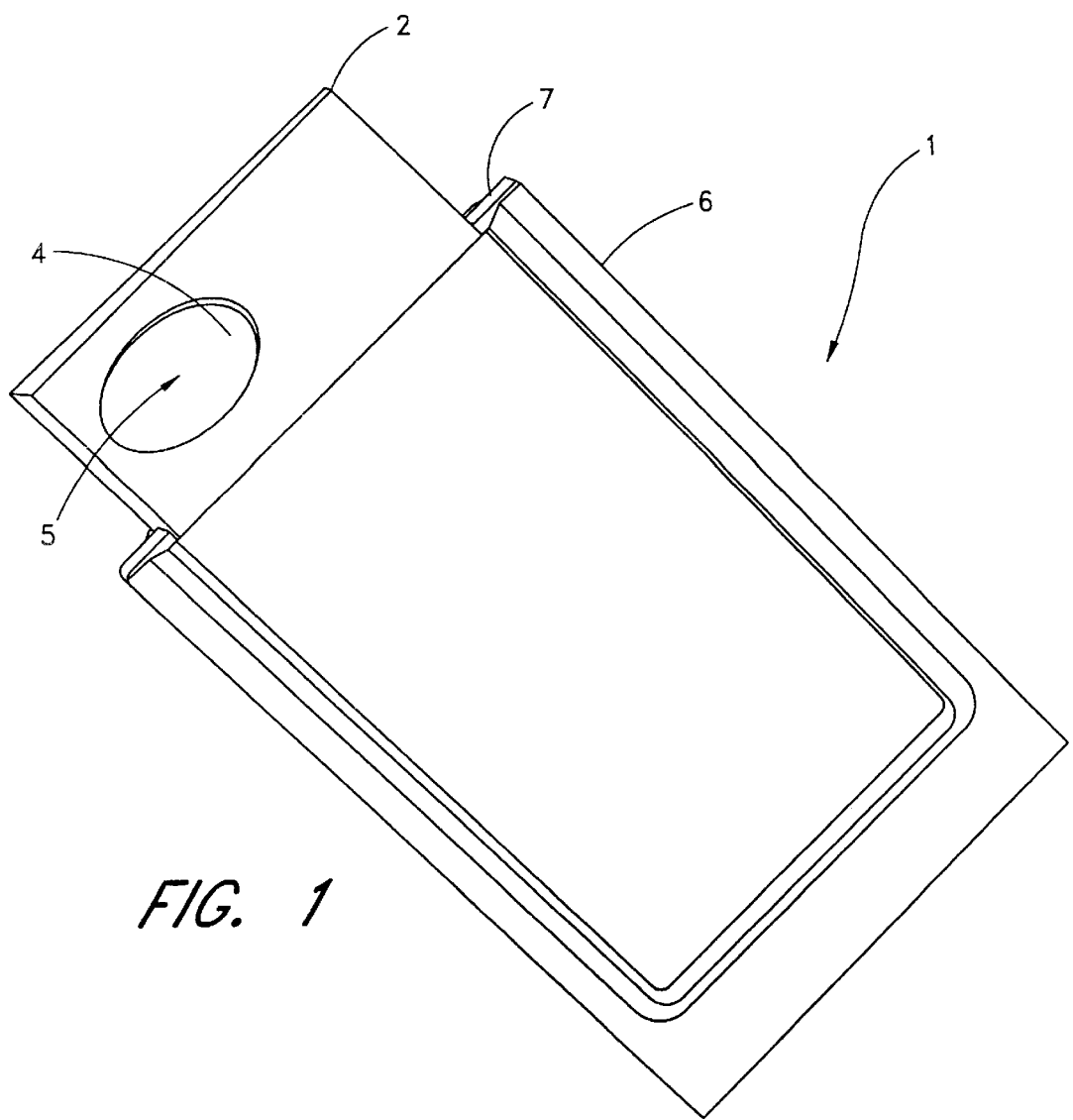
FIG. 1 is a perspective view of an interface card comprising a sensor.

FIG. 1 is a perspective view of one embodiment of an interface card 1. The interface card 1 includes a sensor module 2 located within a housing 6 of the interface card 1. Within the housing 6, the sensor module 2 has two positions, an active or open position in which a portion of the sensor module 2 is exposed at a front end 7 of the interface card 1, and a retracted or closed position in which the sensor module 2 disappears within the housing 6. FIG. 1 shows the sensor module 2 in the active position in which a user can place a finger on a sensor 5 positioned on the sensor module 2. As hereinafter described, the sensor 5 may receive a biometric input, such as a fingerprint, or generally a relief object generator.

Figure 2:
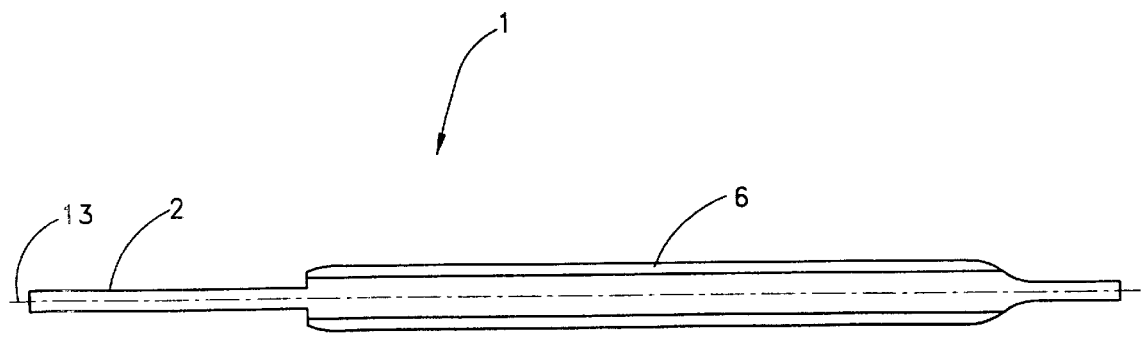
FIG. 2 is a side view of the interface card with an exposed sensor.

FIG. 2 shows a side view of the interface card 1 shown in FIG. 1 with the sensor module 2 in the active position. In the illustrated embodiment, the housing 6 has a rectangular shape and is relatively thin. The housing may have the size of a conventional credit card, i.e., a length of about 8.5 centimeters (cm) and a width of about 5.4 cm with respect to a longitudinal axis 13. The thickness may be about 0.5 cm. Sized like that, the exterior shape of the interface card 1 resembles in one embodiment a communications card used to connect a telephone line to a computer. Such a communications card is defined by the Personal Computer Memory Card International Association (PCMCIA), and therefore often referred to as a "PCMCIA card" or "PC card." However, it is contemplated that the interface card 1 may have a different size and thickness.

In one application, a PCMCIA card is configured to operate as a modem. The PCMCIA card is insertable, for example, into a slot of a laptop computer and has a connector to connect the laptop computer to a telephone line of a public telephone network or a private branch exchange. The user of the laptop computer can then communicate with a user of a remote computer or access an Internet service provider such as America Online, the Microsoft Network, or CompuServe to name a few. In other exemplary applications of a PCMCIA card, the PCMCIA card is used to connect a laptop computer to an external hard disk drive, an external CD-ROM drive or a local area network (LAN). In the latter case, the PCMCIA card is configured to operate as a LAN network interface.

Returning to the interface card 1 of the present invention, the sensor module 2 comprises a carrier element comprising the sensor 5 to receive a finger as one example for a relief object. Electronic circuits located on the sensor module 2 or at other locations within the interface card 1, operate and control the sensor module 2. In one embodiment, the sensor module 2 is configured so that a user can place a finger onto the sensor 5 in the open position. Hereinafter, the interface card 1 and the sensor module 2 are described with reference to, but not limited to, sensing and analyzing fingerprints. However, it is contemplated that the sensor area 4 can be shaped and sized that other objects can be placed onto the sensor area 4.

The part of the sensor module 2 that is exposed in the active position has, for example, a thickness of about 1–2 mm. As shown in FIG. 1 the sensor area 4 is an oval having a maximal length of about 2 cm, and a maximal width of about 1.5 cm. The sensor 5 has thus a contact area of about 2–5 cm$^2$. The length of the oval may extend parallel or perpendicular to the longitudinal axis 13. In other embodiments, the sensor 5 may have a circular, square, or any other shape of sufficient size to contact a sufficiently large part of the finger.

The sensor 5 of the sensor module 2 generates an electronic signal in response to a finger placed on the sensor 5. The electronic signal corresponds to an electronic representation of a tip of a user's finger. As is well known, a human fingertip has a surface that forms a unique pattern of ridges and valleys. This unique pattern of the fingertip, or a print caused when the fingertip is placed on a surface is often referred to as a "fingerprint." Hereinafter, this term is generally used to refer to the unique pattern of the fingertip and the print caused by the fingertip.

In response to the presence of the fingerprint, the sensor 5 itself or in conjunction with control electronics generates the electronic representation ("electronic image" or "digital image") of the fingerprint. The electronic image resulting from sensing the fingerprint of a present user is referred to as the "sensed" fingerprint to distinguish it from a "stored"

fingerprint of an authorized user. As described below in greater detail, if the sensed fingerprint matches the stored fingerprint, the present user is identified as the authorized user.

Figure 3:
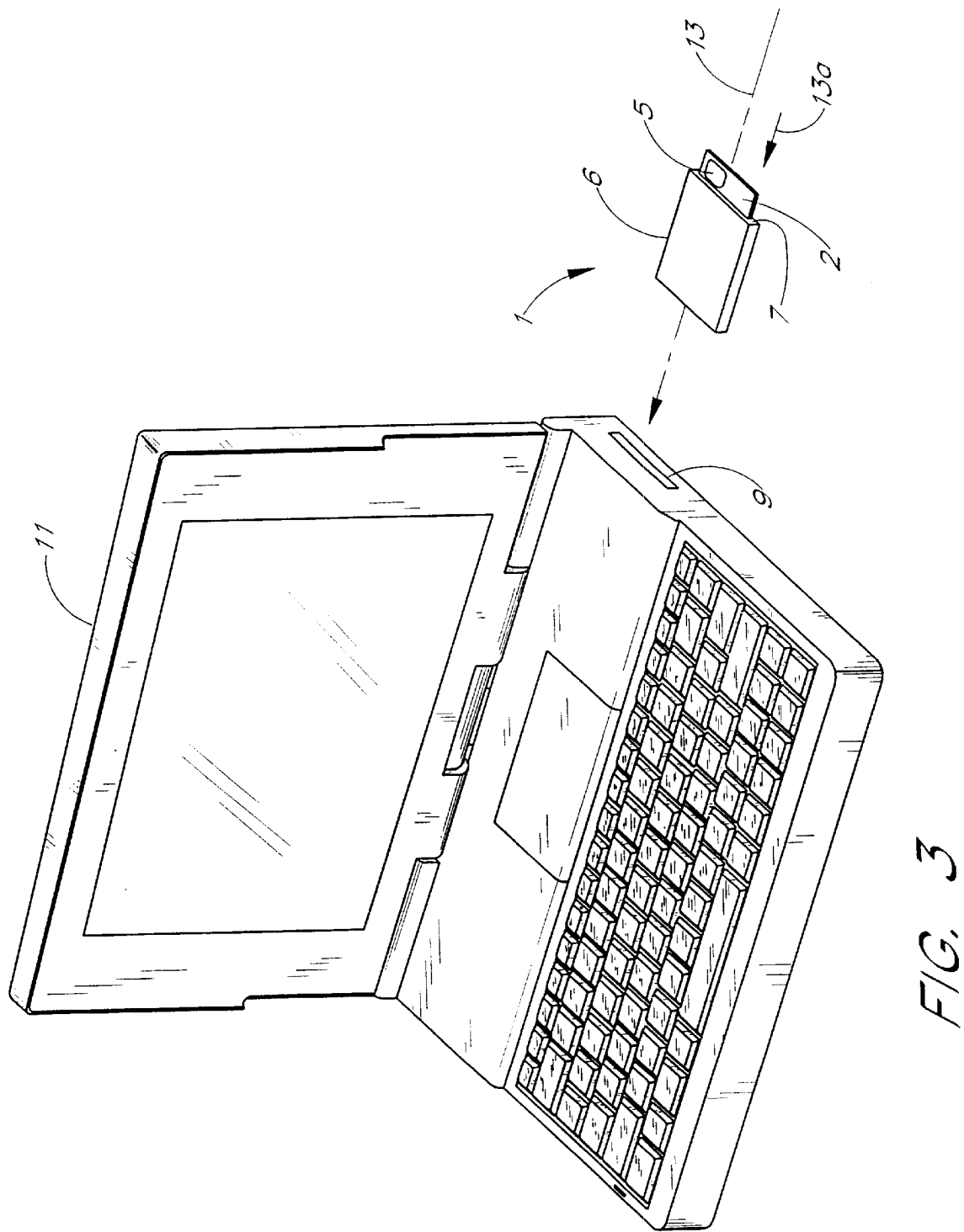
FIG. 3 shows an exemplary use of the interface card in a portable computer.

FIG. 3 shows one exemplary application in which a host system receives the interface card 1. The host system, for example, a portable (laptop) computer 11 has a slot 9 which receives the interface card 1. Once inserted, the interface card 1 essentially disappears within the laptop computer 11, and only the front end 7 of the interface card 1 remains visible and accessible by the user. As discussed below, in order to move the sensor module 2 between the active and retracted positions, the user needs to press against the sensor module 2 as indicated through an arrow 13a that is parallel to the longitudinal axis 13 of the interface card 1. The slot 9 is in one embodiment a conventional PCMCIA slot configured to receive a PCMCIA card.

It is contemplated that the host system may be a personal computer (PC), a security system, or other equipment installed, for example, in an access-restricted location where high-level security is needed. The interface card 1 or the host system process the sensed fingerprint of the present user and match it with the stored fingerprint of the authorized user. The host system allows full operation of the host system itself, access to a restricted area, or execution of an e-commerce transaction only if the sensed fingerprint matches the stored fingerprint of the authorized user.

Figure 4:
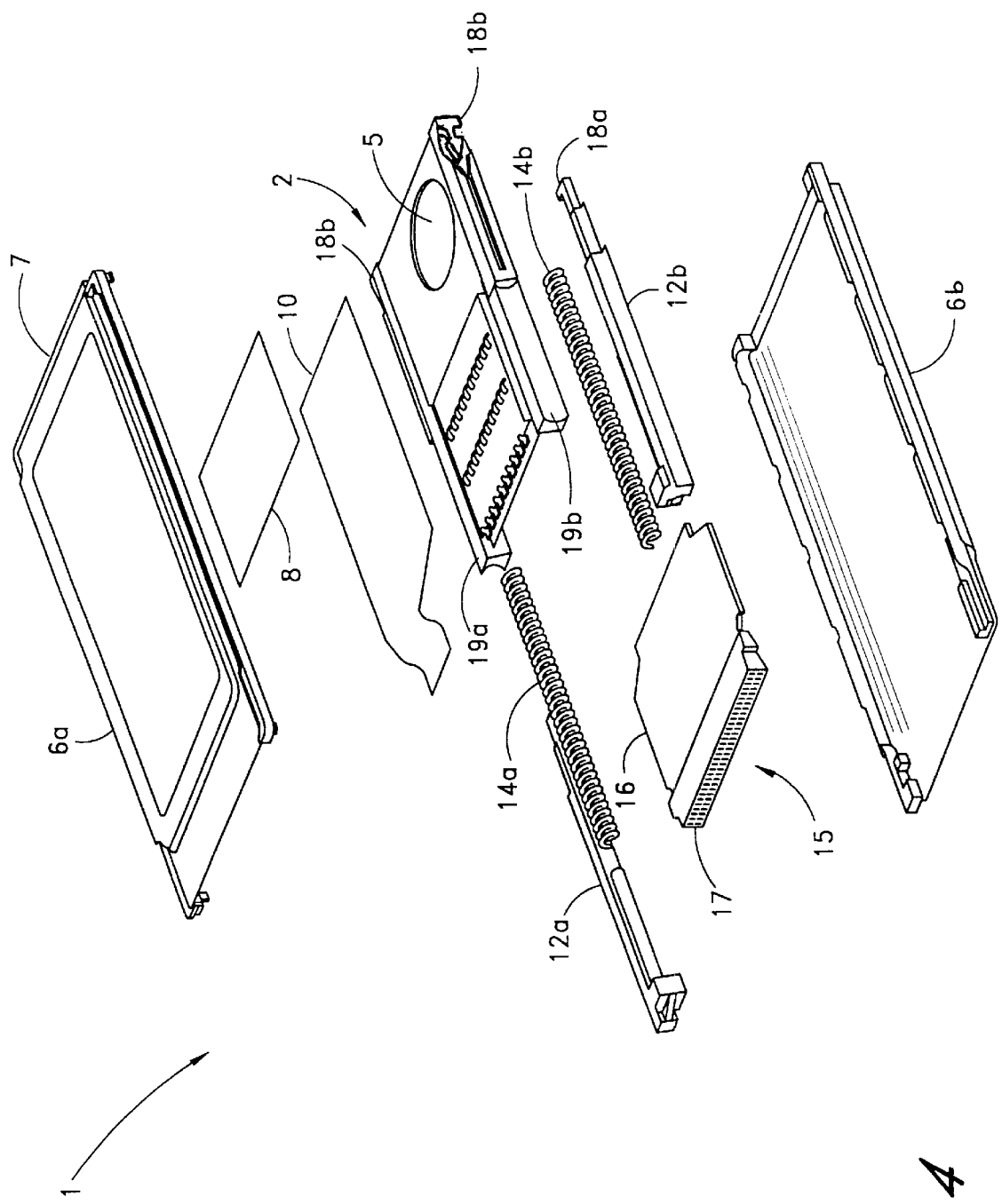
FIG. 4 shows an exploded view of the interface card.

Focusing on a first embodiment of the interface card 1 and its mechanical, structural details, FIG. 4 shows an exploded view of the interface card 1. The housing 6 of the interface card 1 includes an upper part 6a and a bottom part 6b which enclose the sensor module 2, a connector (interface) module 15 and a retraction mechanism. A communications bus 10, configured as a flexible circuit board, affixed to the upper part 6a by an adhesive layer 8, connects the sensor module 2 and the connector module 15. Within the interface card 1, the sensor module 2 is movable with respect to the connector module 15 which is stationary and provides for communications between the sensor module 2 and the host system.

The host system powers the interface card 1 via the connector module 15, and the connector module 15 powers the sensor module 2 via the communications bus 10. In one embodiment, the connector (interface) module 15 powers the sensor module 2 only in the open position. In the open position, contacts on the sensor module 2 complete an electrical circuit on the connector module 15. This circuit then applies power and communications/control signals to the sensor module 2 via the communications bus 10. As soon as the sensor module 2 slides back into the closed position, the electrical connection is interrupted. For instance, the contacts on the sensor module 2 are configured to slide along the communications bus 10 until the sensor module 2 is in the open position.

Figure 4A:
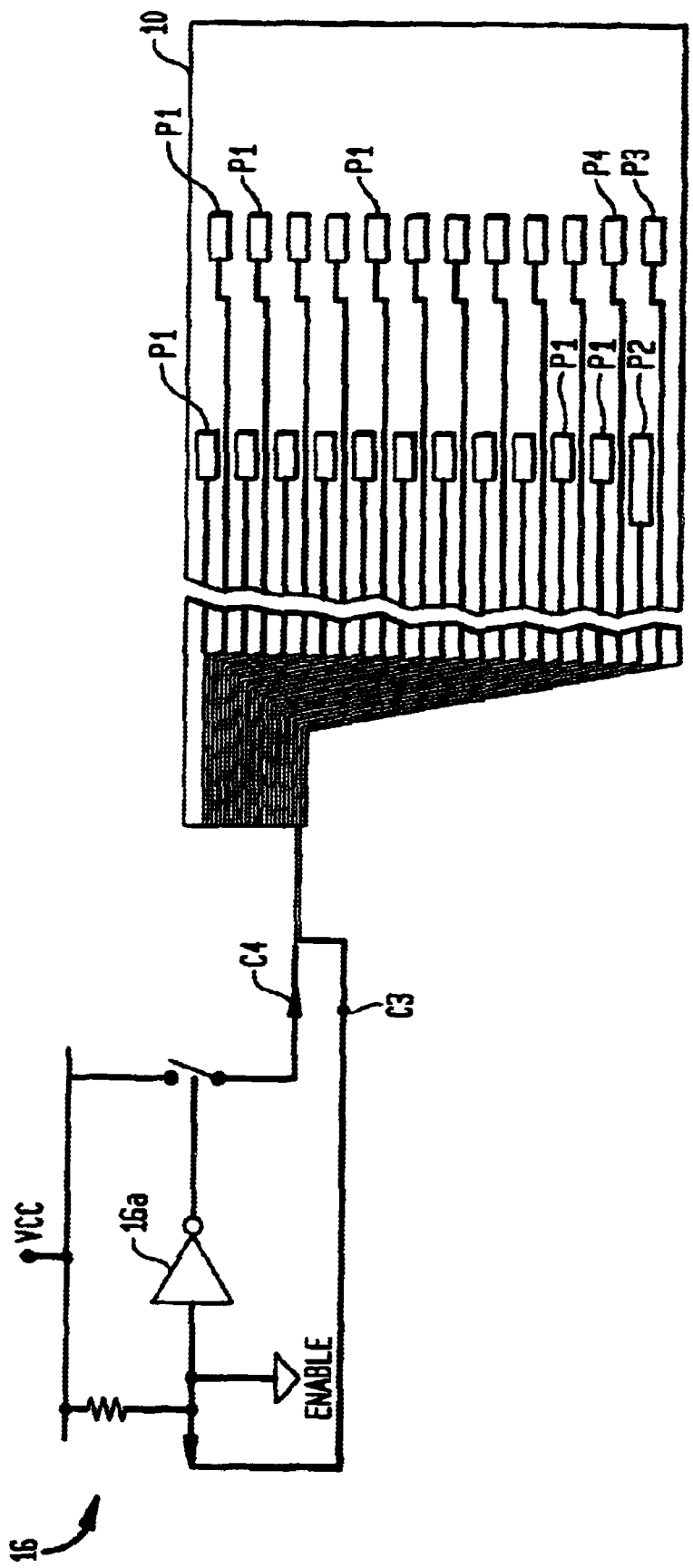
FIG. 4A shows an illustration of a communications bus configured as a flexible circuit board with contact pads.

FIG. 4A shows an illustration of the communications bus 10 configured as a flexible circuit board with contact pads P1–P4. The contact pads P1–P4 face the sensor module 2 and are arranged in two rows to cooperate with two rows of contact pads on the sensor module 2. The communications bus 10 is connected to a circuit on the connector module 15. The circuit includes an inverter 16a having an input connected to a power supply (VCC) via a resistor. The input of the inverter 16a is connected to a port C3 which is connected to the contact pad P3 on the communications bus 10. The contact pad P3 serves as "out" sense connection to detect if the sensor module 2 is in the open position. A port C4 associated with an output of the circuit is connected to the contact pad P4 on the communications bus 10 and provides power (e.g., 5 volts) to the contact pad P4. The remaining contact pads P1 are connected to signal lines of the communications bus 10 which lead to the connector module 15. The contact pad P2 provides for a ground connection.

The contact pads on the sensor module 2 slide between the two rows of contact pads P1–P4 on the communications bus 10. The "out" sense connection is at a level "high" when the sensor module 2 is not in the active, open position. When the sensor module 2 is in the active position the contact pads P2 and P3 are connected together and the circuit on the connector module 15 activates the power to the sensor module 2 along with interface signals.

In one embodiment, the upper and lower parts 6a, 6b of the housing 6 are pressed metal shells connected through a frame of plastic-like material. The metal shells shield interior electronic circuits from external electromagnetic influence and provide for sufficient mechanical stability of the interface card.

The connector module 15 includes a multiple-pin connector 17 and a printed circuit board (PCB) 16 connected to the multiple-pin connector 17. The retraction mechanism is attached to the connector module 15 and includes two parallel lateral guide members 12a, 12b that extend in longitudinal direction of the interface card 1. Each guide member 12a, 12b has a proximal end connected to the connector module 15 and a distal end facing the front end 7 of the interface card 1. The retraction mechanism includes further two lateral biasing members 14a, 14b that extend parallel to the guide members 12a, 12b. The biasing members 14a, 14b act on the movable sensor module 2 to bias it along the longitudinal axis 13 in a direction opposite to the direction indicated through the arrow 13a. In the illustrated embodiment the biasing members 14a, 14b are helical springs, for example, metal springs. In other embodiments, the biasing members 14a, 14b may be molded plastic equivalents to helical springs. For example, contra-wound helixes which resemble tubes with diamond shaped cut-outs. Such contra-wound helixes have the advantage of being more stable and bend resistant and by controlling the width of the material remaining, the "spring" can be made to "bottom out" at a predetermined compressed distance.

The sensor module 2 has two lateral guide rails 19a, 19b that receive and guide sections of the biasing members 14a, 14b and the guide members 12a, 12b. At the front end 7, the sensor module 2 has two lateral latch elements 18b that cooperate with complementary latch elements 18a located at the distal end of the guide members 12a, 12b. The latch elements 18a, 18b are part of a latch mechanism that allows the sensor module 2 to have two stable positions, open and closed, within the interface card 1. An exemplary embodiment of the latch element 18b is shown in FIGS. 20A–20H and described below. When the user presses against the front end 7, the latch mechanism releases the sensor module 2 and the retraction mechanism pushes the sensor module 2 from the closed position into the open position. After use, the user pushes the sensor module 2 back into the closed position and the latch elements 18a, 18b engage retaining the sensor module 2 in the closed position.

Figure 5:
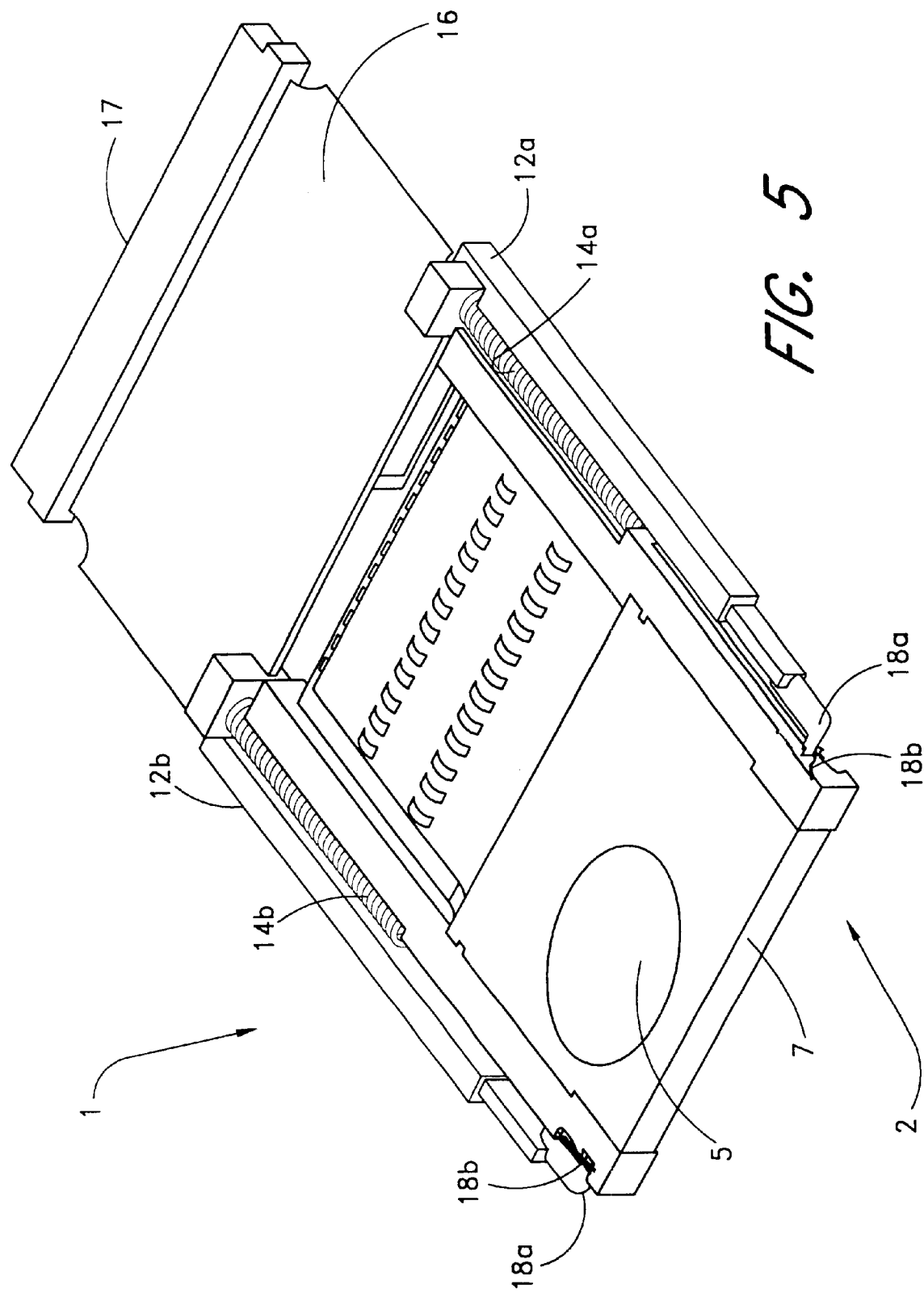
FIG. 5 shows the interface card in a closed position with the housing removed.

FIG. 5 shows the assembled interface card 1 in the closed position. The housing 6 and the communications bus 10 are removed to expose the internal structure of the interface card 1. The latch elements 18a, 18b engage and secure the sensor module 2 within the interface card 1 in the closed position. As illustrated, the biasing members 14a, 14b are compressed and bias the sensor module 2 into the open position.

Figure 6:
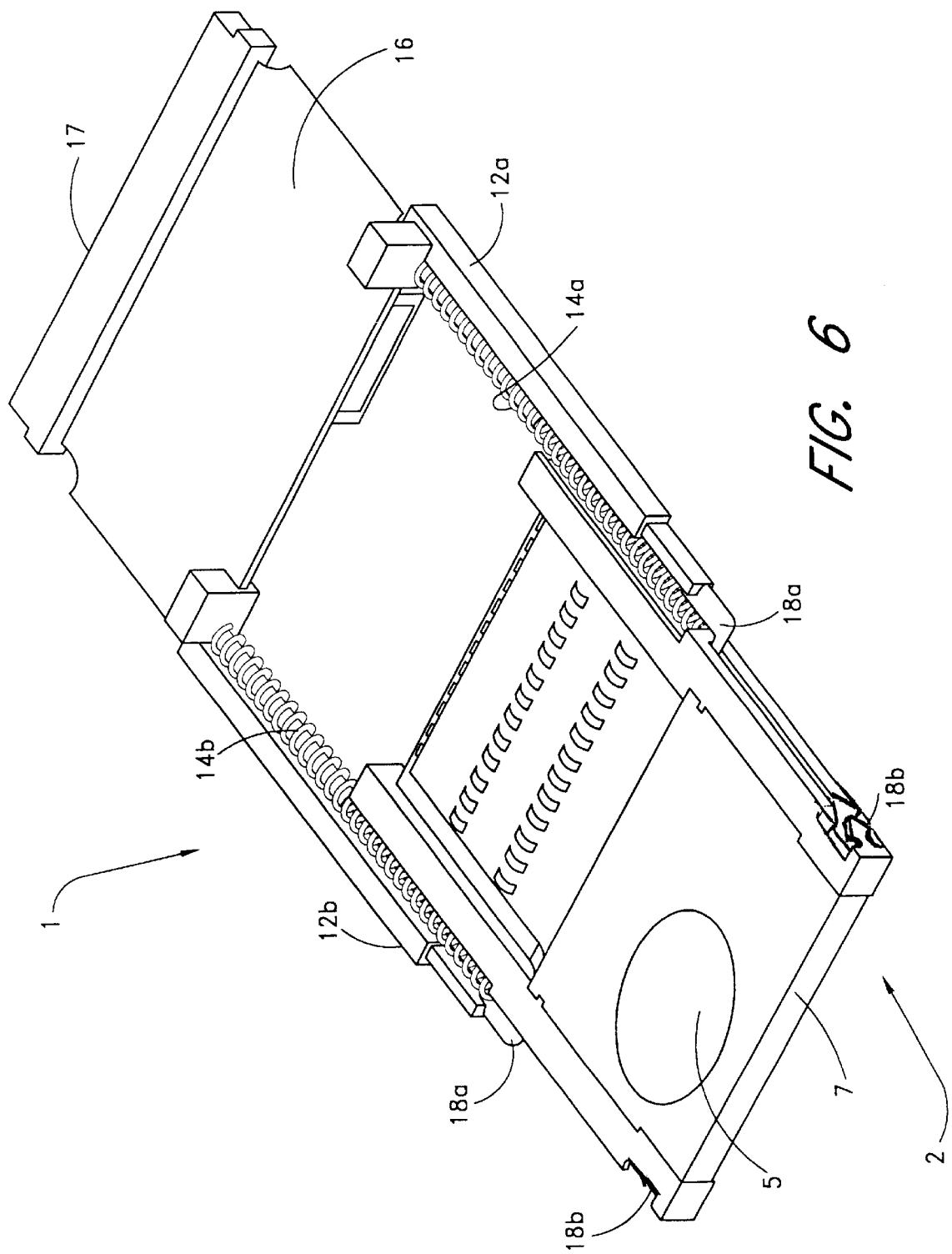
FIG. 6 shows the interface card in an open position with the housing removed.

FIG. 6 shows the assembled interface card 1 in the open position. The latch elements 18a, 18b are disengaged and the sensor module 2 was urged into the open position by the biasing members 14a, 14b. As illustrated, the biasing members 14a, 14b are expanded.

Figure 7:
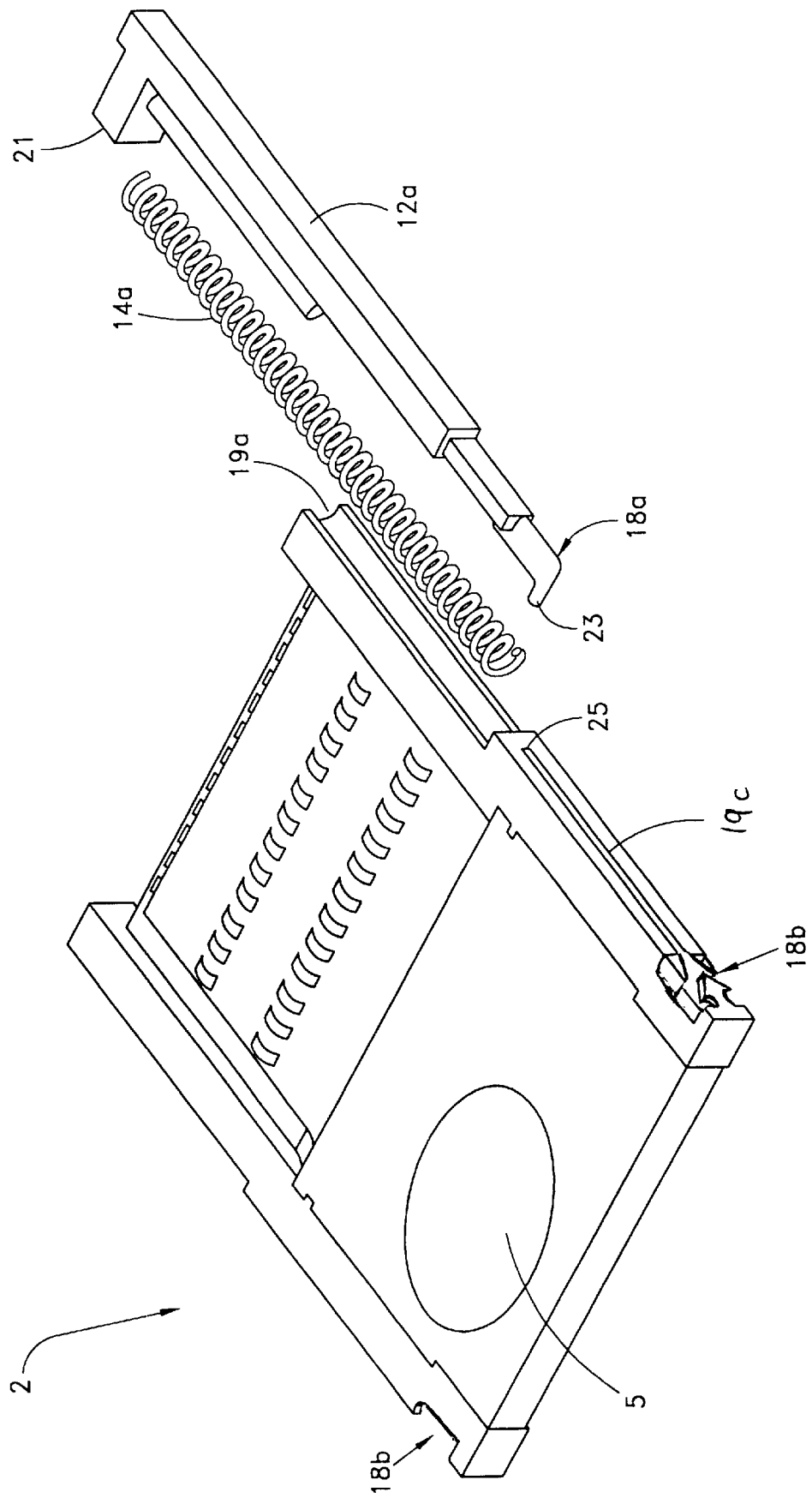
FIG. 7 shows an embodiment of a latch mechanism.

FIG. 7 illustrates the latch mechanism in greater detail. For ease of illustration the latch mechanism of only one side of the sensor module 2 is shown. The lateral guide member 12a has a proximal end 21 and a distal end that includes the latch element 18a. In the illustrated embodiment, the guide member 12a is thicker at the proximal end 21 than at the distal end. That is, the area of the rectangular cross-section decreases step-wise so that the guide member 12a has a predetermined amount of mechanical resistance or stiffness and can move in two dimensions. At the "thin" distal end, the latch element 18a has a prong 23 that engages with the opposite latch element 18b in the closed position.

The latch element 18b opens into a guide rail 19c that is sized to guide the prong 23 when the sensor module 2 moves between the open and closed positions. The guide rail 19c has a length that is about the width of the sensor 5 to provide for sufficient exposure of the sensor 5. The guide rail 19c has a stop end 25 opposite the latch element 18b that stops the prong 23 and prevents that the sensor module 2 drops out of the interface card 1. The distance between the latch element 18b and the stop end 25 determines how far the sensor module 2 can move out.

The guide rail 19a is recessed with respect to the guide rail 19c and separate from the guide rail 19c. The recess between the guide rails 19a, 19c serves as a support for the biasing element 14a that extends between the support and the distal end 21 of the guide member 12a. In a relaxed condition, the biasing element 14a has a length that corresponds slightly longer so that some force remains to push 2a approximately to a length of the guide member 12a. Preferably, the length of the biasing element is slightly longer than the guide member 12a so that some force remains to push the sensor module 2 out. As illustrated, the guide member 12a with its step-wise decreasing cross-section is essentially complementary to the structure of the side of the sensor module 2.

The latch mechanism may be configured to allow a user or a service technician to remove the sensor module 2 completely from the interface card 1. For instance, the user can insert a tool or a paper-clip wire between the latch element 18a and the guide rail 19c when the sensor module 2 is in the open position. The tool then prevents that the prong 23 of the latch element 18a is stopped by the stop end 25. Once the sensor module 2 is removed, the sensor 5 can be cleaned or replaced. For example, the cover 20 (as shown on FIG. 8A) can be removed and the underlying sensor surface may be cleaned. The durability of the interface card 1 is therefore improved.

Figure 7A:
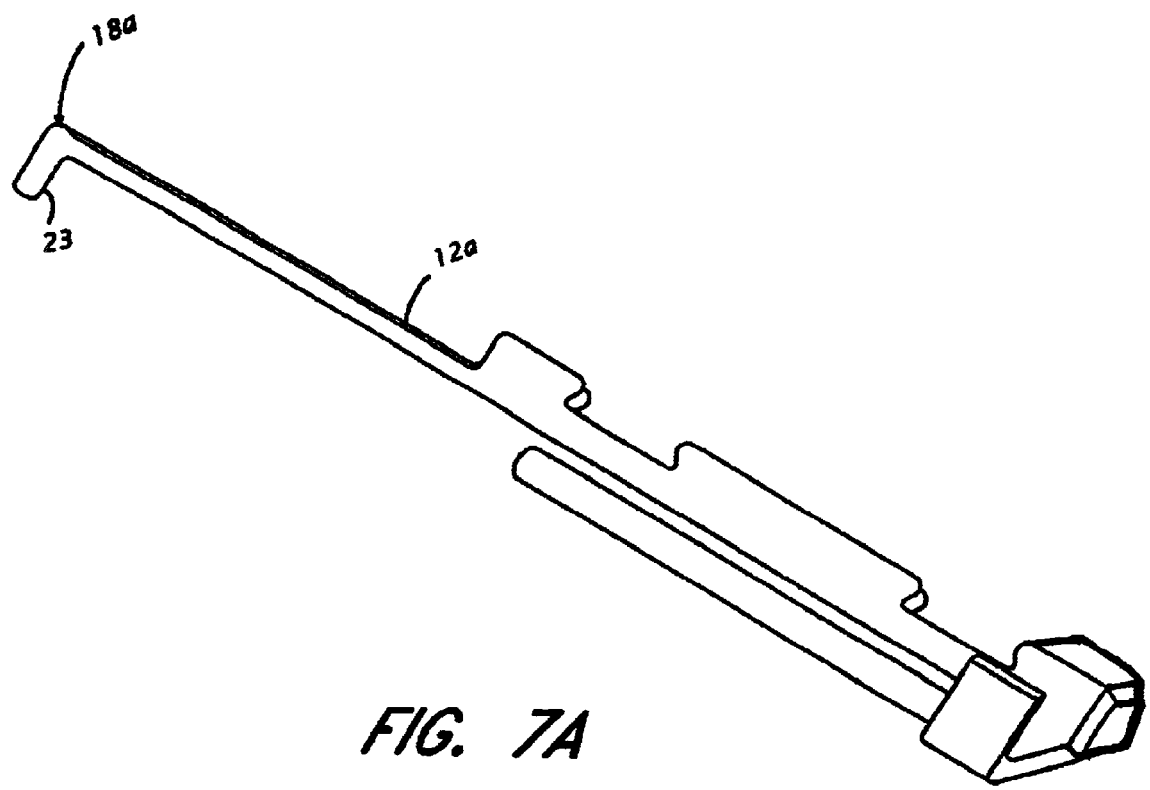
FIG. 7A shows a further embodiment of a guide element.
Figure 7B:
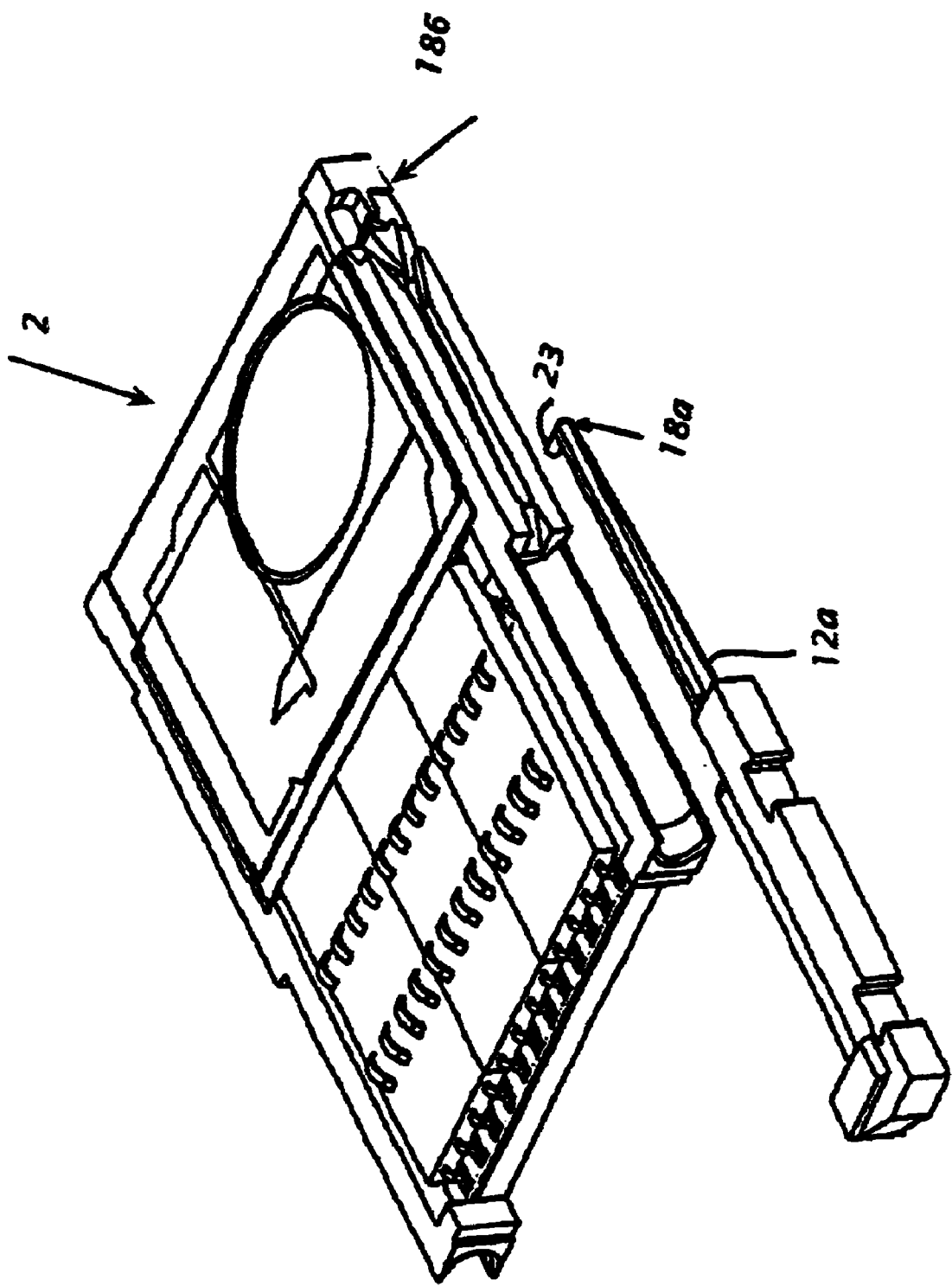
FIG. 7B shows the guide element of FIG. 7A with respect to the sensor module of the interface card.

FIG. 7A shows a further embodiment of the guide element 12a. Instead of having a step-wise decreasing cross-section, this embodiment of the guide element 12a has an essentially constant cross-section. The guide element 12 has recesses to secure the guide element 12a between the upper and bottom parts 6a, 6b of the housing 6. FIG. 7B shows the guide element 12a of FIG. 7A with respect to the sensor module 2 of the interface card 1, and FIG. 7C shows an enlarged illustration of the latch mechanism 18b on the sensor module 2.

FIGS. 8A and 8B illustrate the sensor module 2 in greater detail, wherein FIG. 8A is an exploded view and FIG. 8B is a view of an assembled sensor module 2. The sensor module 2 includes a support frame 27 having a front strut 26 and a rear strut 28. The front and rear struts 26, 28 connect lateral struts 31 so that an opening is formed into which a bottom plate 29 is placed. The lateral struts 31 include the latch elements 18a, 18b, and the rails 19a, 19b, 19d. In one embodiment, the lateral struts 31 are higher than the front and rear struts 26, 28.

The frame 27 receives a printed circuit board (PCB) 30 that carries an electronic circuit 22 and the sensor 5. In one embodiment, the sensor 5 includes a light emitting (LE) material (e.g., a light emitting polymer) that has a flexible extension 24 that serves as an electrode and connects the LE material from an upper side of the PCB 30 to a lower side of the PCB 30. The LE material is covered by a cover 20 which has an opening 20a defining an "active" area onto which a user can place a finger.

As illustrated, the opening 20a is an oval with a longitudinal axis perpendicular to the lateral struts 31. It is contemplated that the opening 20a may have other shapes sized to receive a sufficient part of the user's finger. The cover 20 may be a thin sheet of metal, e.g., pressed steel, that has a flange that covers and protects the front end of the sensor module 2. The cover 20 serves as a "finger guide" and forms an electrical ground return.

As shown in FIG. 8B, the PCB 30 carrying the electronic circuit 22 and the sensor 5 fits between the lateral struts 31. As the lateral struts 31 are higher than the front and rear struts 26, 28, the upper surface of the sensor 5 is essentially flush with upper surfaces of the lateral struts 31.

Figure 9:
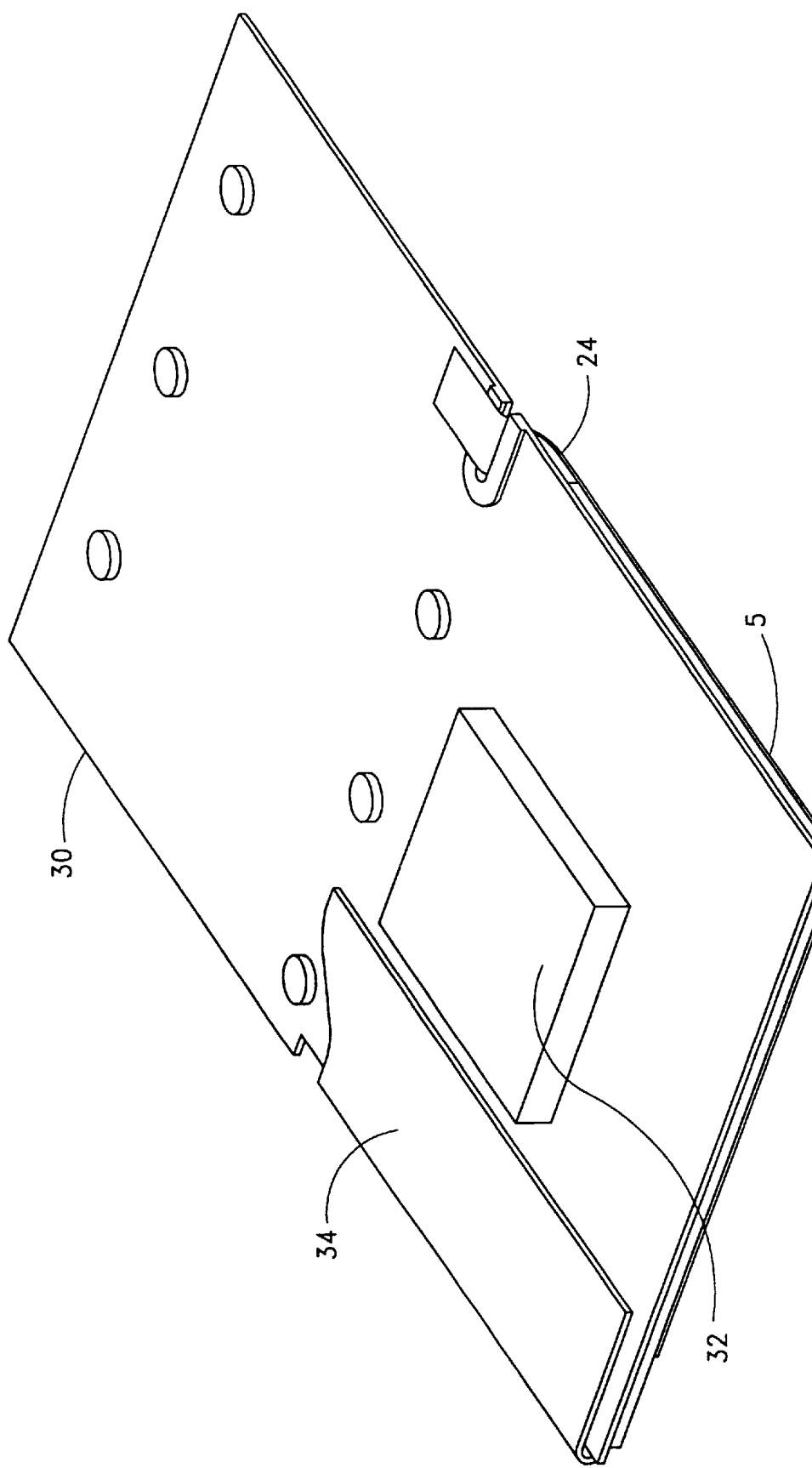
FIG. 9 is a bottom view of the sensor module.

FIG. 9 is a bottom view of the PCB 30, wherein the sensor 5 and the extension 24 are visible. The extension 24 connects the LE material of the sensor 5 to a port that is, via the communications bus 10, connectable to an external power supply. Underneath the active area defined by the opening 20a, the PCB 30 has a drive/control integrated circuit 32 that is connected to an extension 34. The extension 34 connects the drive/control circuit 32 to the upper side of the PCB 30 and to the electronic circuit 22. The drive/control circuit 32 is described below.

Figure 10:
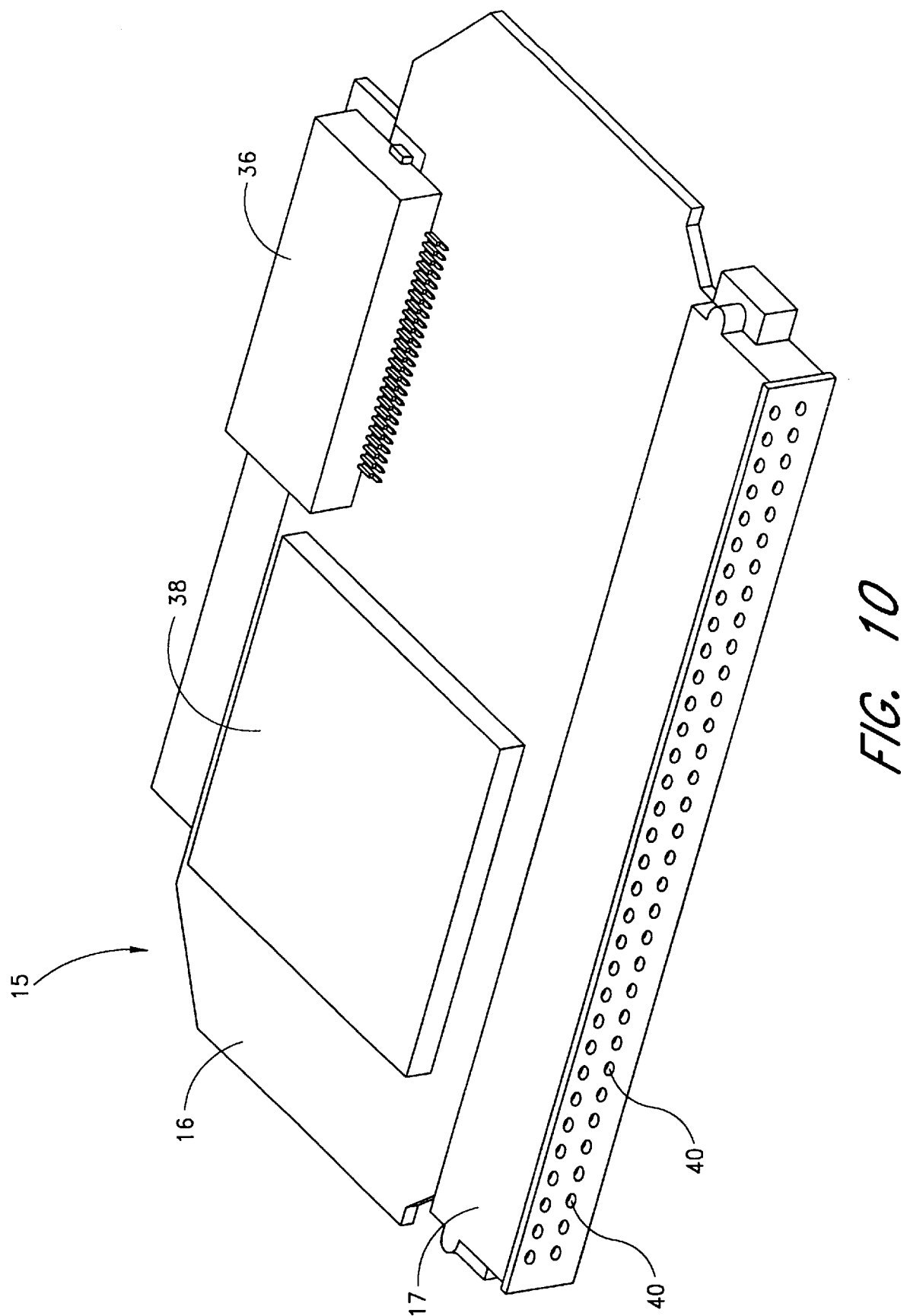
FIG. 10 shows an embodiment of a connector module of the interface card.

FIG. 10 shows an embodiment of the connector module 15 of the interface card 1. The connector module 15 includes the multiple-pin connector 17 and the PCB 16 connected to the multiple-pin connector 17. In one embodiment, the multiple-pin connector 17 has two rows of pins 40. The PCB 16 carries a memory device 38 and an interface circuit 36 that is connected to the communications bus 10 shown in FIG. 4. The memory device 38 stores operational parameters of the interface card 1, and the interface circuit 36 connects the memory device 38 to the communications bus 10, and the communications bus 10 to the multiple-pin connector 17 and, thus, to the host system.

Figure 11:
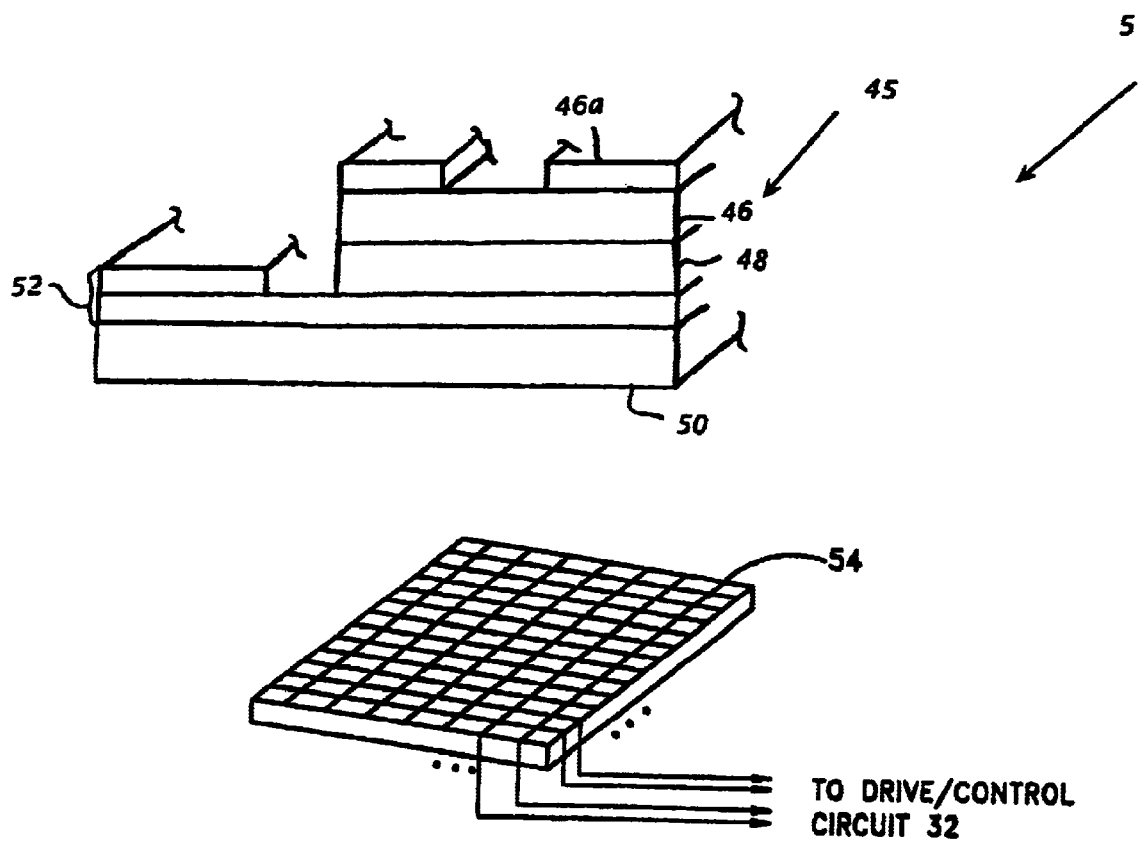
FIG. 11 shows an embodiment of a sensor.

The sensor module 2 includes the sensor 5 onto which the user can place a finger. FIG. 11 shows an illustration of the sensor 5 which generates an electronic representation of the user's fingertip characteristic, for example, the user's fingerprint, or a surface structure of a relief object. In one embodiment, the sensor 5 includes a primary sensor 45 that differentiates electric variations between the ridges and valleys that make up a fingerprint. When appropriately stimulated the LS material, for example, a polymer film senses a finger's electric field and immediately transforms this electric-field information to a light/dark representation of the original fingerprint. That is, the electric-field information is converted to a high-resolution image, which is then captured by a custom designed secondary sensor 54. This secondary sensor 54 in combination with the control circuit 32 shown in FIG. 9 transforms the representation of the image into a digital representation which is then available for further processing.

In one embodiment, the primary sensor 45 is positioned above the secondary sensor 54 and includes several layers. A base layer 50 is the layer closest to the secondary sensor 54 and supports a light-emitting phosphor layer 48. The base layer 50 may be a transparent plastic or glass substrate. Between the phosphor layer 48 and the base layer 50 a conductive layer 52 exists which powers the primary sensor 45. The conductive layer 52 may include a conductive coating optimizing the electrical connection to the phosphor layer 48 and a transparent conductive layer, e.g., ITO. The transparent conductive layer covers the base layer 50, wherein the conductive coating covers only a portion of the base layer 50 as illustrated. The conductive layer 52 blends in to the extension 24 shown, for example, in FIG. 8A. The phosphor layer 48 is covered by a dielectric layer 46 which is partially covered by an adhesive and insulating layer 46a. The dielectric layer 46 blocks ambient light and protects the phosphor layer 48. The adhesive and insulating layer 46a. receives the finger guide, e.g., formed by the cover 20 shown in FIG. 8A.

Figure 12:
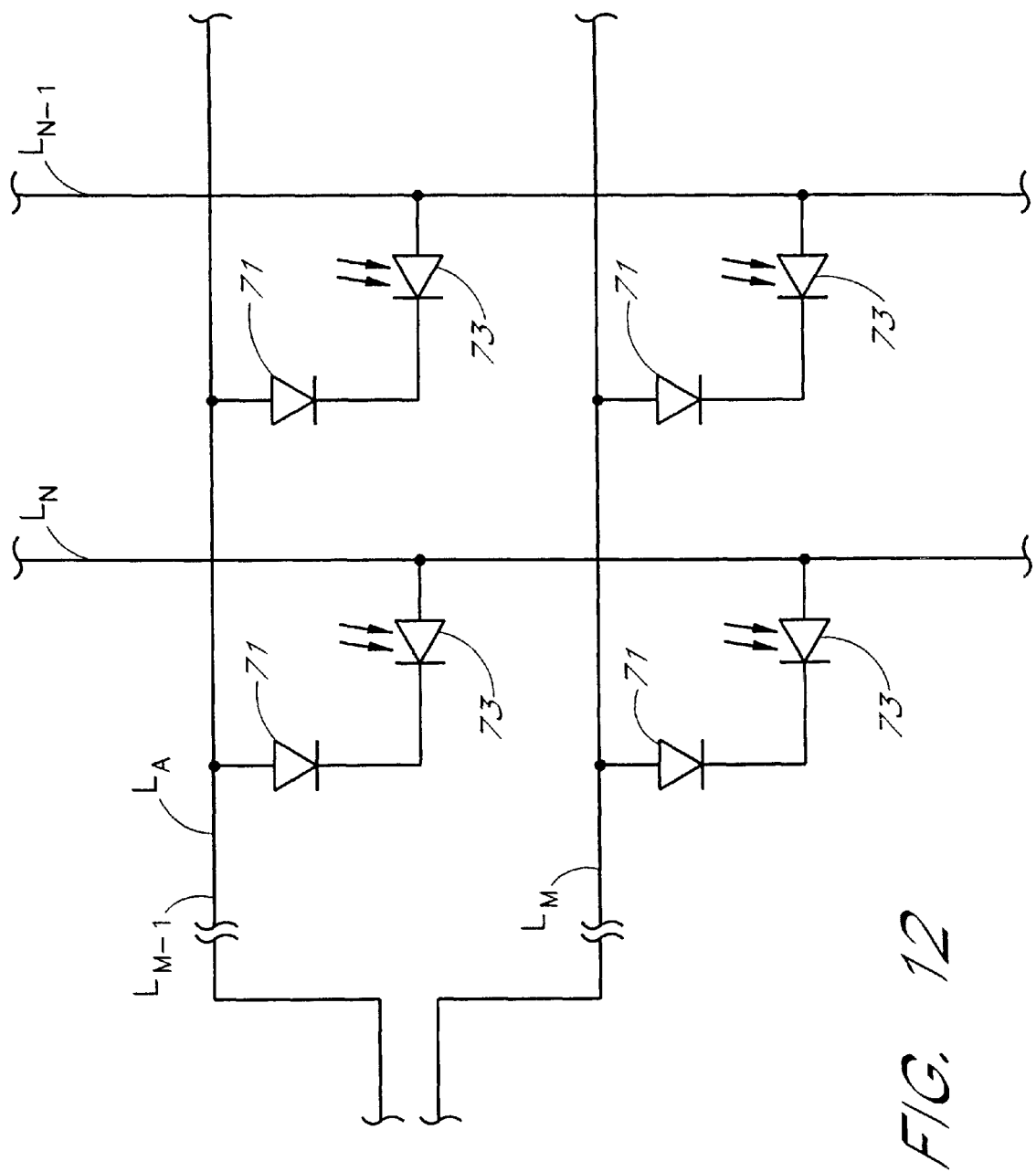
FIG. 12 shows an embodiment of a photodetector array.

The secondary sensor 54 is connected to the drive/control circuit 32 described below in greater detail and implemented on a glass substrate. The secondary sensor 54 has a structure comprising an array of individual pixels arranged in rows and columns, for example, as shown in FIG. 12. Each pixel includes a photosensitive element and a charge-storing mechanism. An electronic circuit selectively addresses the pixels and "reads" from each pixel to determine if a pixel has been exposed to light. As described below in greater detail, a row driver selects a specific row of the array and a column driver selects a specific column to address a desired pixel to "read" from this pixel.

In one embodiment, the glass substrate is sandwiched between the primary and secondary sensors 45, 54. The sensor 5 formed by the combination of the two sensors 45, 54 may be referred to as relief object image generator. The primary sensor 45 may include a polymer material known as TactileSense and available from Who?Vision, Inc. The secondary sensor may be a photodetector array available from Philips. It is contemplated that the secondary sensor may be use optical, capacitive or thin film transistor arrays. Further details of the sensor 5 are disclosed in co-pending application entitled "Relief Object Image Generator" filed Sep. 5, 1997, application Ser. No. 08/926,277, the disclosure of which is herewith incorporated by reference herein. The sensor 5 is also disclosed in a co-pending application entitled "Method and System for Computer Access and Cursor Control Using a Relief Object Image Generator" filed Apr. 24, 1998, application Ser. No. 09/066,625, the disclosure of which is herewith incorporated by reference herein.

In another exemplary embodiment, the image sensor 5 can be a capacitive fingerprint sensor that distinguishes valleys and ridges based on differences in effective capacitances between the finger surface and the sensor surface. The capacitive sensor is also structured as an array of individual pixels.

FIG. 12 shows a schematic circuit diagram of a pixel array of the secondary sensor 54 included in the sensor 5. For ease of illustration, only circuit diagrams of four pixels are shown in greater detail. Each pixel includes one photodetector 73 and one switching element 71 and is connected to a data line $L_N$, $LN_{-1}$ and an address line $L_M$, $LM_{-1}$. It is contemplated that N and M are positive integers. In the illustrated embodiment, the photodetector 73 is a photodiode, and the switching element 71 is a switching diode, each having an anode and a cathode. The photodetector 73 is hereinafter referred to as the photodiode 73.

As each pixel has the same structure, one embodiment of the pixel array is described hereinafter with reference to the pixel that is connected to the address line $L_M$ and the data line $L_N$. The photodiode 73 and the switching diode 71 are connected in series with the cathode of the switching diode 71 connected to the address line $L_M$ and the cathode of the photodiode 73 connected to the data line $L_N$. The anodes of the diodes 71, 73 are thus connected. The switching diode 71 is obscured so that no light can fall on it. The photodiode 73 has an active area that is relative large to maximize an inherent "self" capacitance and configured so that light may fall on it.

The address lines $L_M$, $LM_{-1}$ and the data lines $L_N$, $LN_{-1}$ are connected to the drive/control circuit 32 located underneath the active area of the sensor 5 and control the operation of the pixel array. For example, the drive/control circuit 32 selectively provides an address voltage $V_A$ having predetermined voltage levels of predetermined durations to the address lines $L_M$, $LM_{-1}$, and, thus, to the cathodes of the individual switching diodes 71. The drive/control circuit 32 includes amplifiers which in operation receive data voltages $V_D$. In one embodiment, the amplifiers are charge-sensitive amplifiers.

Figure 13:
FIGS. 13 and 14 show timing diagrams of the photodetector array.
Figure 14:
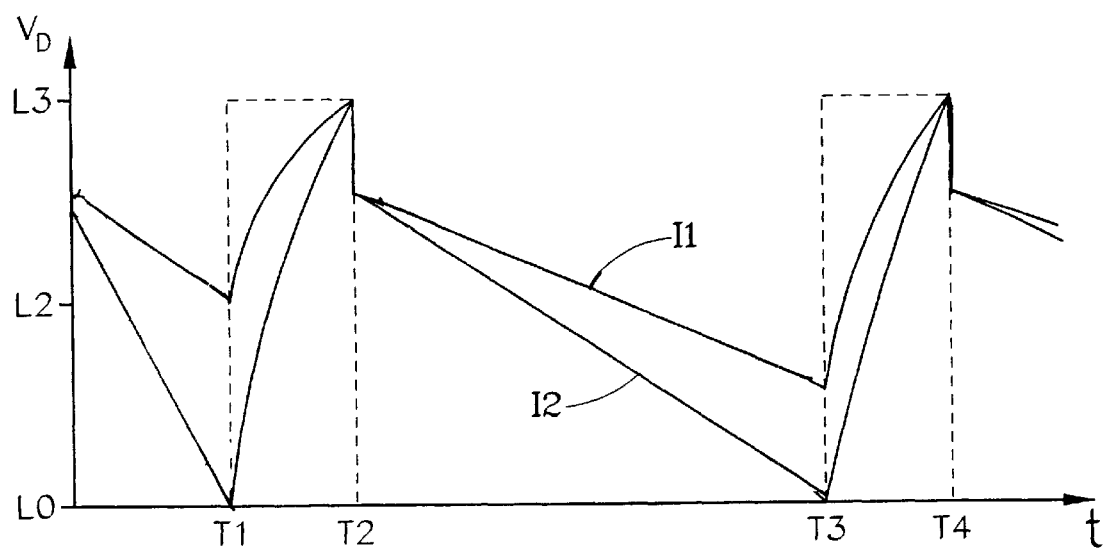

FIGS. 13 and 14 show timing diagrams, i.e., voltages as a function of time t, illustrating the operation of the circuit shown in FIG. 12. In operation, as shown in FIG. 13, the drive/control circuit 32 addresses the address lines $L_M$ periodically with an address voltage $V_A$. At t=T1, the address voltage $V_A$ changes from a low-voltage level L0, to a higher-voltage level L1, and returns to the level L0 at t=T2. The period between t=T1 and t=T2 is referred to as "pulse duration." At t=T3, the address voltage $V_A$ changes again from the low-voltage level L0 to the higher-voltage level L1, and returns to the low-voltage level L0 at t=T4.

During the pulse duration, the switching diode 71 is forward biased and a forward-bias current flows through the switching diode 71. The forward-bias current charges an inherent (parasitic) capacitance of the photodiode 73. Following t=T2, i.e., following the falling edge of the address voltage $V_A$ the switching diode 71 and the photodiode 73 are reverse biased.

Between two consecutive pulses, i.e., between t=T2 and t=T3, and when the pixel is illuminated, the capacitance of the photodiode 73 is discharged by the photocurrent (diode leakage current) generated in the photodiode 73. This amount of charge is detected during the following pulse when the photodiode 73 is charged back to its original value, as explained with reference to FIG. 14.

FIG. 14 shows the data voltage $V_D$ between t=T1 and t=T4 for two different illuminations I1, I2, with I1<I2. The higher illumination I2 generates a higher photocurrent than the lower illumination I1. A high photocurrent discharges the capacitance of the photodiode 73 faster than a relative low photocurrent. Hence, at the illumination I2, the data voltage $V_D$ is lower at t=T1 and t=T3 than at the illumination I1. As illustrated, at these instances t=T1 and t=T3 the data voltage $V_D$ is at a level L0 at the illumination I2, and at a level L2, at the illumination I1. The amplifiers of the drive/control circuit 32 detect the amount of charge that is necessary to re-charge the capacitance of the photodiode 73.

As the data voltage $V_D$ for the illumination I2 is lower than the data voltage $V_D$ for the illumination I1 at the beginning of the rising edge of the address voltage $V_A$, a higher amount of charge is necessary to re-charge the capacitance of the photodiode 73 at the illumination I2. The amount necessary for the re-charging is, thus, an indication if a pixel was exposed to light. As illustrated, the voltage $V_D$ increases within the pulse duration from the level L0 or the level L2, respectively, to a level L3.

Figure 15:
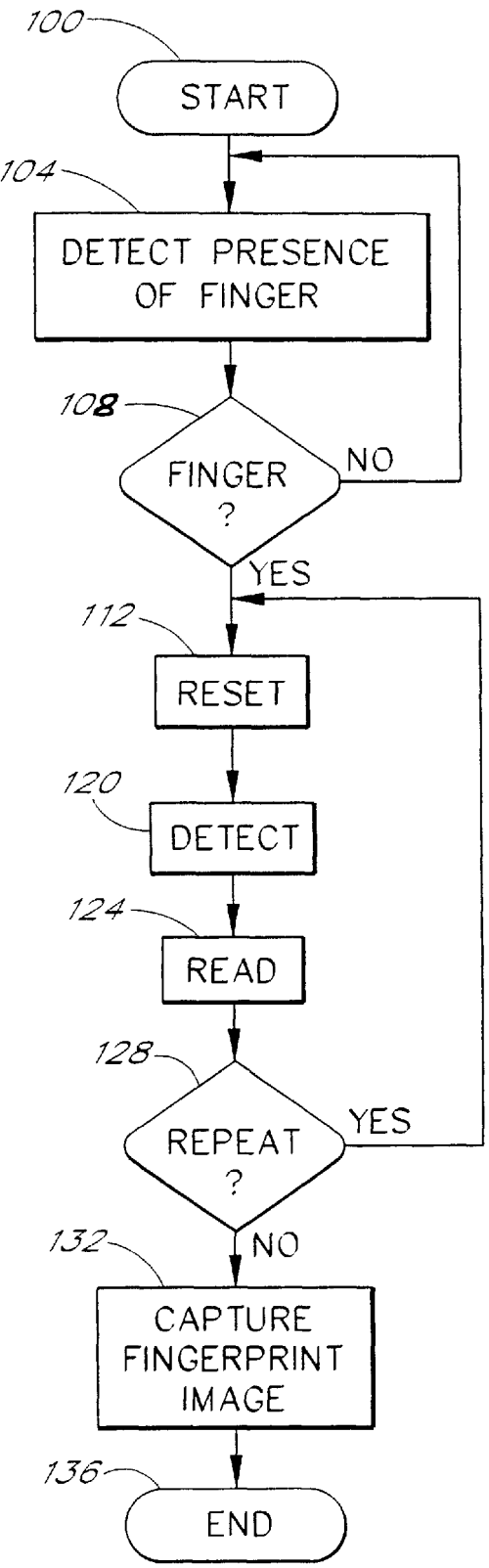
FIG. 15 shows a flowchart of a procedure to generate an electronic representation of a fingerprint.

Continuing with describing the operation of the interface card 1, FIG. 15 is a flow chart illustrating a procedure of operating the sensor 5 of the interface card 1. The procedure is described with reference to the detector array shown in FIG. 12. The procedure is initialized in step 100 in which the interface card 1 alone or in combination with the host system may conduct a self-test to determine, for example, if the interface card 1 is properly inserted, and if the drive/control circuit 32, and the sensor 5 are properly connected and operable.

Proceeding to steps 104 and 108, the drive/control circuit 32 determines if the finger is placed on to the sensor 5. For instance, this may be achieved by detecting if a current flows between the sensor 5 and the user. In step 108, if no finger is detected, the procedure returns along the NO branch to step 104. As long as no finger is detected, the drive/control circuit 32 disables a further execution of the procedure because no finger is present. However, if the drive/control circuit 32 detects a finger, the procedure proceeds along the YES branch to step 112. It is contemplated that the steps 104 and 108 are optional and may be omitted in systems that are not configured to detect the presence of a finger.

Proceeding to step 112, the drive/control circuit 32 resets the sensor 5 to prepare capturing of the fingerprint caused by the finger. For instance, the drive/control circuit 32 provides no power to the array so that the switching diode 71 and the photodiode 73 have sufficient time to discharge.

Proceeding to step 120, the drive/control circuit 32 applies a positive voltage $V_A$ (level L1) to the address lines $L_M$, $LM_{-1}$, and thus to the cathodes of the switching diodes 71. During this detect cycle, the photodiodes 73 are reverse biased and light generates a photocurrent in an illuminated photodiode 73 altering the charge in the charge storing mechanism (FIG. 14). Photodiodes 73, however, that are not exposed to light do not generate photocurrents. As explained above, the light originates from the primary sensor 45 and represents the present fingerprint.

Proceeding to step 124, the drive/control circuit 32 reads from each pixel via the data lines $L_N$, $LN_{-1}$ and the respective voltages $V_D$. During this read cycle, the drive/control circuit 32 determines the charge necessary to recharge the charge storing mechanism of the secondary sensor 54. In their entirety, values for these charges represent a digital representation of the fingerprint. The drive/control circuit 32, in one embodiment in combination with the host system, can evaluate the representation and determine the quality of the representation, for example, if the fingerprint image is too bright or too dark. This may be adjusted by changing the exposure time or changing the drive signal level for the sensor 5.

Because of this adjustment process, the steps 112–124 may be repeated as indicated in step 128. In one embodiment, the procedure returns along the YES branch to step 112 three times in order to generate four representations of the fingerprint images. In an "idle" period between each image capture settings are changed, e.g., sensor drive or exposure time, such that the fourth image is "good." When the fourth representation is generated the procedure proceeds along the NO branch to step 132.

In step 132, the final representation of the fingerprint image is captured and stored in a storage device. The storage device may be located within the host system or the interface card 1. The storage device may be accessed by a matching unit, which compares the captured representation of the present fingerprint with a stored fingerprint of the owner. The matching unit may also be located within the interface card 1 or within the host system. The procedure ends at step 136.

Figure 16:
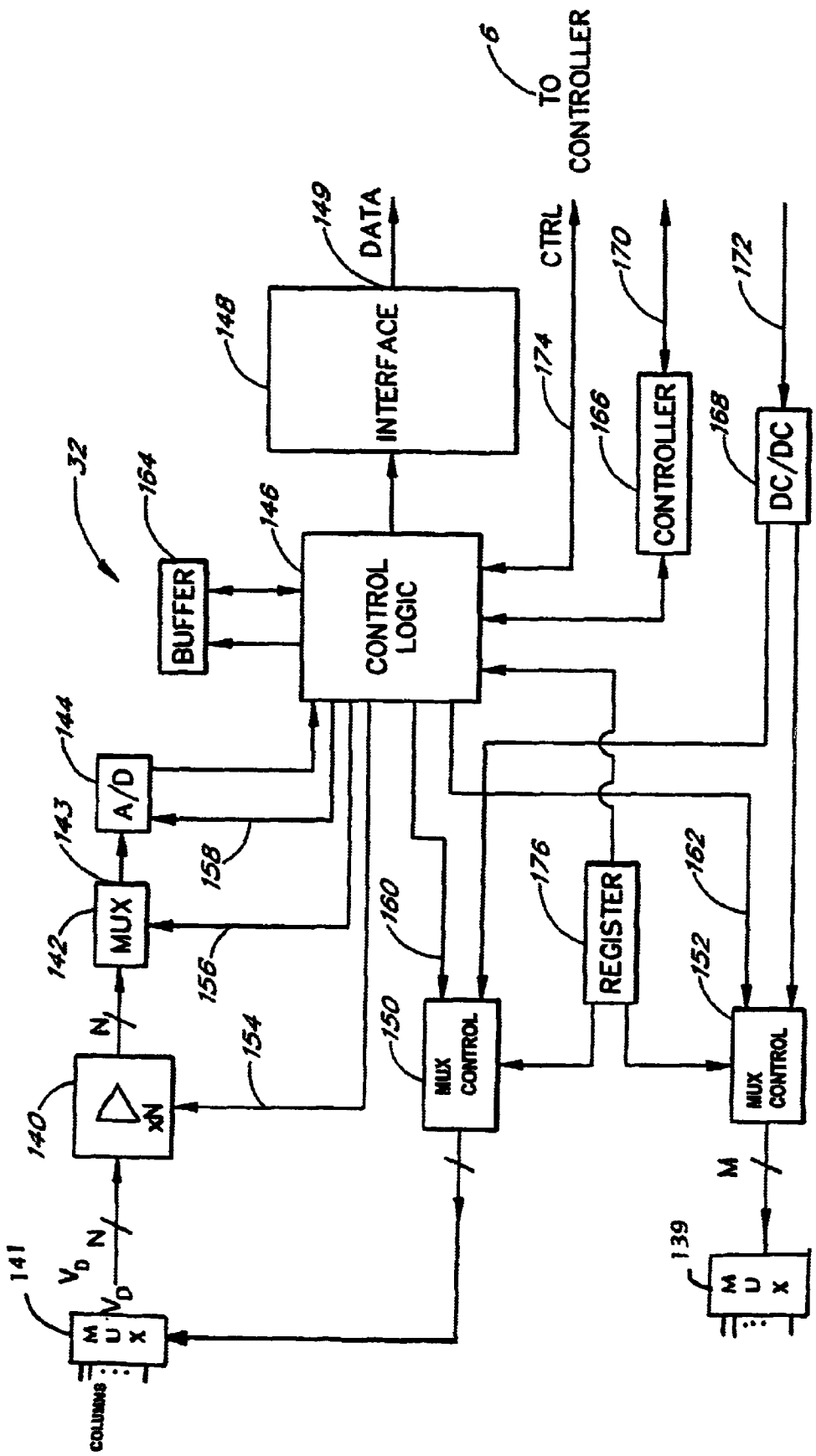
FIG. 16 shows an embodiment of a control and drive for the photodetector array.

FIG. 16 shows a block diagram of one embodiment of the drive/control circuit 32, which is configured for use with the electrical circuit shown in FIG. 12. The drive/control circuit 32 is associated with the N data lines $L_N$, $LN_{-1}$ (columns) and M address lines $L_M$, $LM_{-1}$, (rows) of the sensor 1.

The drive/control circuit 32 includes a multiplexer 142 and an input amplifier module 140 having N inputs and N amplifiers to connect to the data lines $L_N$, $LN_{-1}$ through 4:1 multiplexers 139, 141 which may be implemented at another location of the sensor module 2. For illustrative purposes, the multiplexers 139, 141 are shown in FIG. 16. The N amplifiers of the input amplifier module 140 operate as charge sense amplifiers to determine the charge necessary to re-charge the capacitance of the photodiode 73 (FIG. 14). The input amplifier module 140 has N outputs which are connected to inputs of the multiplexer 142. The multiplexer 142 has an output 143 which is connected to an input of an analog-to-digital (A/D) converter 144. An output of the A/D converter 144 is connected to a control logic 146.

The control logic 146 is connected to an interface 148 which has an output 149 for a signal DATA. The control logic 146 is further connected to a control line 174 (CTRL) to convey control signals, as well as, is connected to a buffer 164 which is used as a memory storage area during operation. A controller 166 is connected to the control logic 146 and to a control line 170. Control lines 154, 156, 158 connect the control logic 146 to the input amplifier module 140, the multiplexer 142, and the A/D converter 144, respectively. For instance, the individual control signals include a control signal to set an amplification factor of the input amplifier module 140, and timing control signals to clock the multiplexer 142 and the A/D converter 144.

The drive/control circuit 32 further includes column and row multiplexer control circuits 150, 152. A control line 160 connects the column multiplexer control circuit 150 and the control logic 146, and a control line 162 connects the row multiplexer control circuit 152 and the control logic 146. In one embodiment, the row multiplexer control circuit 152 has M outputs (e.g., about M=30 output lines) connected to the address lines $L_M$, $LM_{-1}$ via the multiplexer 139, and the column multiplexer control circuit 150 has about 10 output lines connected to the multiplexer 141. The column multiplexer control circuit 150 is connected to a voltage (DC/DC) converter 168, which is also connected to the row multiplexer control circuit 152. The DC/DC converter 168 is connected to a line 172. A register 176 is connected to the row multiplexer control circuit 152, the column driver 150, and the control logic 146. The output 149, and the lines 170, 172, 174 are connected to the communications bus 10.

The drive/control circuit 32 is in one embodiment implemented as an application specific integrated circuit (ASIC), for example, in CMOS technology. Those skilled in the art will appreciate that the drive/control circuit 32 may also be implemented, for example, in hybrid technology using discrete components. Further, those skilled in the art will appreciate that in other embodiments the structure of the illustrated drive/control circuit 32 may be modified although the general function of the drive/control circuit 32 is maintained. For instance, if the diode array is replaced by a thin film-transistor diode arrangement, the multiplexer ratios may change.

The drive/control circuit 32 drives and controls the secondary sensor 54 so that the image from the primary sensor 45 is converted into a digital signal. In the embodiment described above, the interface card 1 transfers the digital signal to the host system. The host system performs then the further processing of the digital signal. This processing includes extracting and generating an electronic representation of the present fingerprint, accessing a memory of stored fingerprints, and matching the present fingerprint with one of the stored fingerprints.

In another embodiment, the interface card 1 may include a processor and a memory storing the fingerprint of the authorized user of the interface card 1. The processor performs the processing of the digital signal which in the previous embodiment is performed by the host system. An advantage of processing the digital signal on-card is that the interface card 1 is an autonomous device that performs the matching and authorization procedure and transmits the result of the match to the host system.

Figure 17:
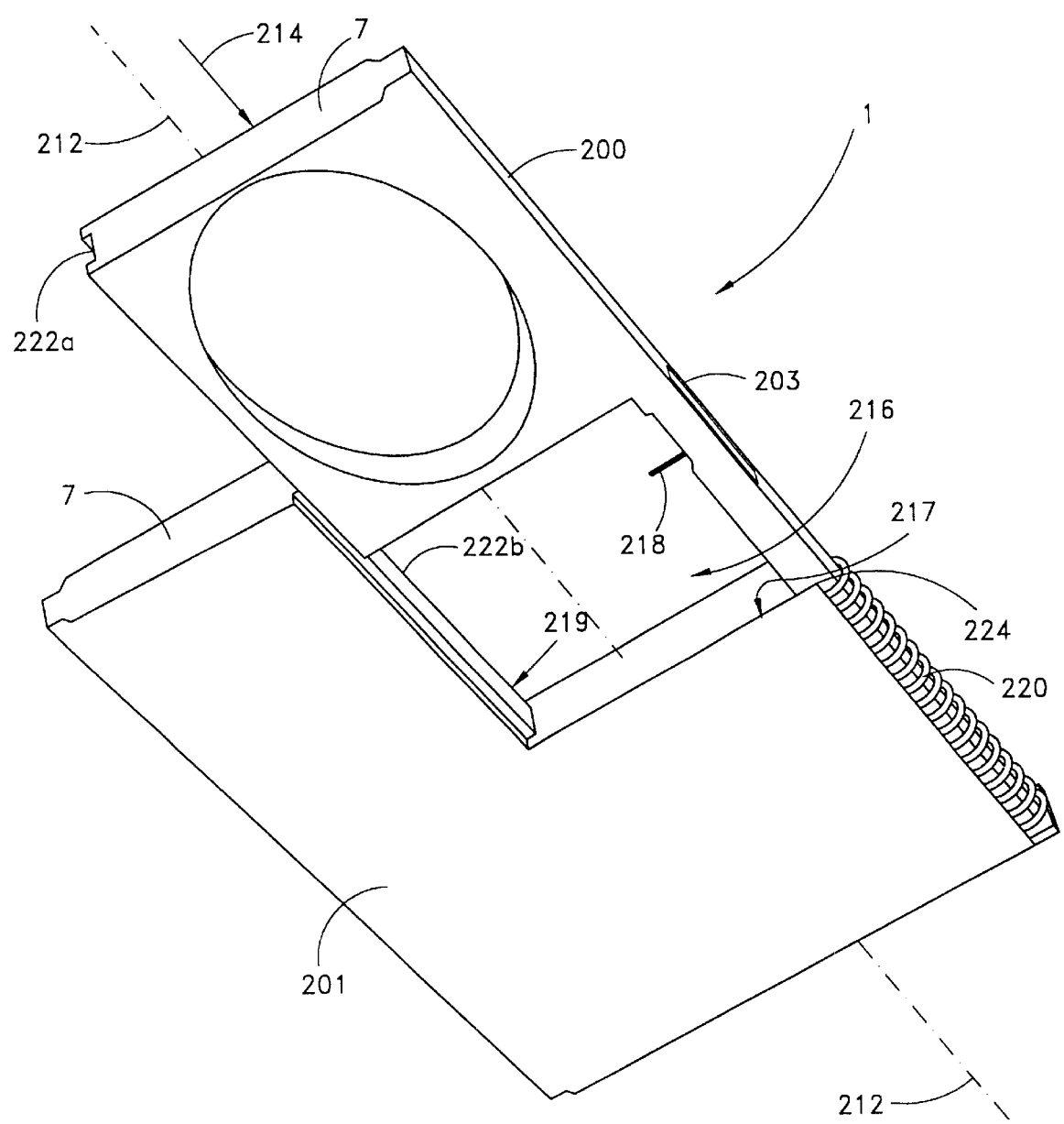
FIG. 17 shows a second embodiment of an interface card with the housing removed.

Focusing on a second embodiment of the interface card 1 and its mechanical, structural details, FIG. 17 shows the interface card 1 with the housing 6 removed. Within the interface card 1, the sensor module 200 is again movable with respect to a fixed part 201. In one embodiment, the movable part 200 includes the sensor 5, and the fixed part 201 includes electric circuits that provide for communications with the sensor 5 and the host system. The electronic circuits are explained below in greater detail.

The movable part 200 is configured to move with respect to the fixed part 201 and is illustrated in a position between the fully exposed and retracted positions. The fixed part 201 includes a substrate material formed and sized to fit into the housing 6. The fixed part 201 has a recess 216 formed, for example, by removing a rectangular section from the originally rectangular shaped substrate material. When the rectangular section is removed an inner, longitudinal side 219 and an inner, transverse side 217 remain which limit the recess 216. The sensor module 200 comprises the rectangular-shaped carrier element which is sized to fit into the recess 216 so that the sensor module 200 and the fixed part 201 are essentially flush at the front end 7 of the interface card 1. Together the fixed part 201 and the sensor module 200 have a rectangular shape corresponding essentially to the housing 6 of the interface card 1.

The sensor module 200 includes an elongate guide member 203 that extends in parallel to a longitudinal axis 212 of the interface card 1 from the carrier element at a side opposite to the front end 7. In one embodiment, the guide member 203 has a rectangular cross section sized to glide in a recessed, complementary rail 224 of the Fixed part 201. In FIG. 17, the rail 224 is shown at the lower right side of the fixed part 201. The fixed part 201 comprises further a projecting rail 222b shaped to cooperate with a recessed rail 222a of the sensor module 200. The rail 222b is parallel to the rail 224, but extends within the recess 216 along the longitudinal side 219. Associated with the rail 224 and the guide member 203 is an elastic element 220, such as a spring or spring-like elements as discussed above, which acts on the sensor module 200 to bias the sensor module 200 along the longitudinal axis 212 in a direction opposite to the direction indicated through the arrow 214. The rails 222a, 222b, 224 and the guide element 203 provide that the sensor module 200 smoothly glides from the recessed position to the active position, and vice versa.

The sensor module 200 includes a latch mechanism that retains the sensor module 200 in the recessed position. Part of the latch mechanism is in one embodiment a projection 218 that extends from the guide element 203 inwardly in a direction essentially perpendicular to the longitudinal axis 212. The user can release the latch mechanism by pressing on the front end 7 of the sensor module 200. Once released, the spring-biased sensor module 200 pops out and the sensor 5 is accessible.

Figure 18:
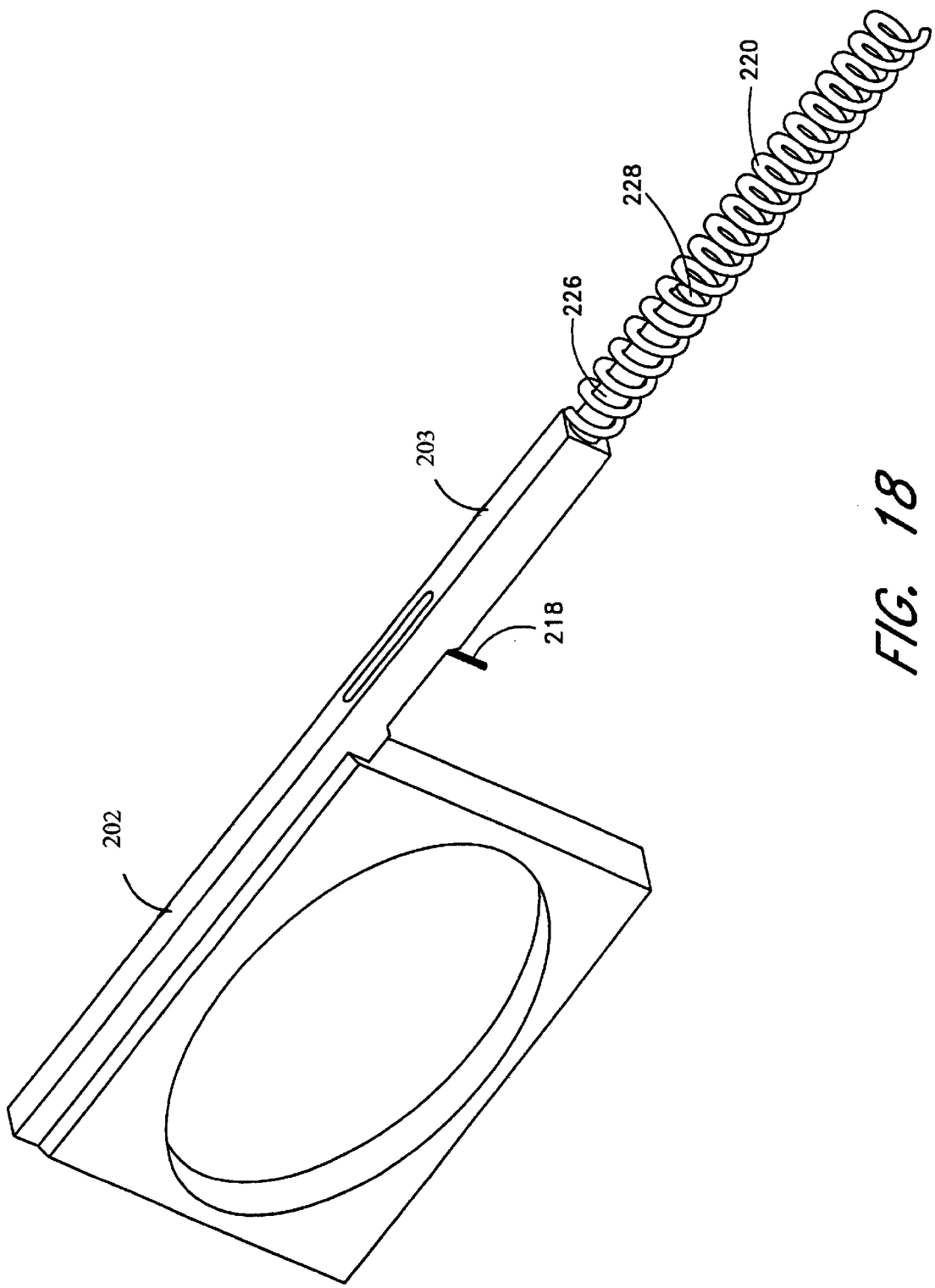
FIG. 18 shows an embodiment of a movable sensor part.

FIG. 18 shows the sensor module 200 with the therefrom extending guide element 203 separate from the fixed part 201. It is contemplated that the guide element 203 is part of the sensor module 200 and that these two parts 202, 203 may be integrally formed. In another embodiment, the guide element 203 may be a separate element attached to the sensor module 200, however, still being considered as part of the sensor module 200 for purposes of this description. The guide element 203 has an end 228 distal from the sensor module 200. At the end 228 the guide element 203 has a cylindrical section 226 receiving a part of the elastic element 220, which may be a helical spring as illustrated.

The carrier element of the sensor module 200 and the guide element 203, and the fixed part 201 may be implemented using a plastic-like material. In one embodiment, the fixed part 201 may be a printed circuit board (PCB), or a PVC or ABS carrier supporting a PCB. The sensor module 200 including the guide element 203, may similarly be formed of PVC or ABS carrying the sensor 5. The projection 218 is part of a hook secured to the guide element 203 in proximity of the sensor module 200. The hook may be a metal hook inserted into an opening of the guide element 203.

Figure 19:
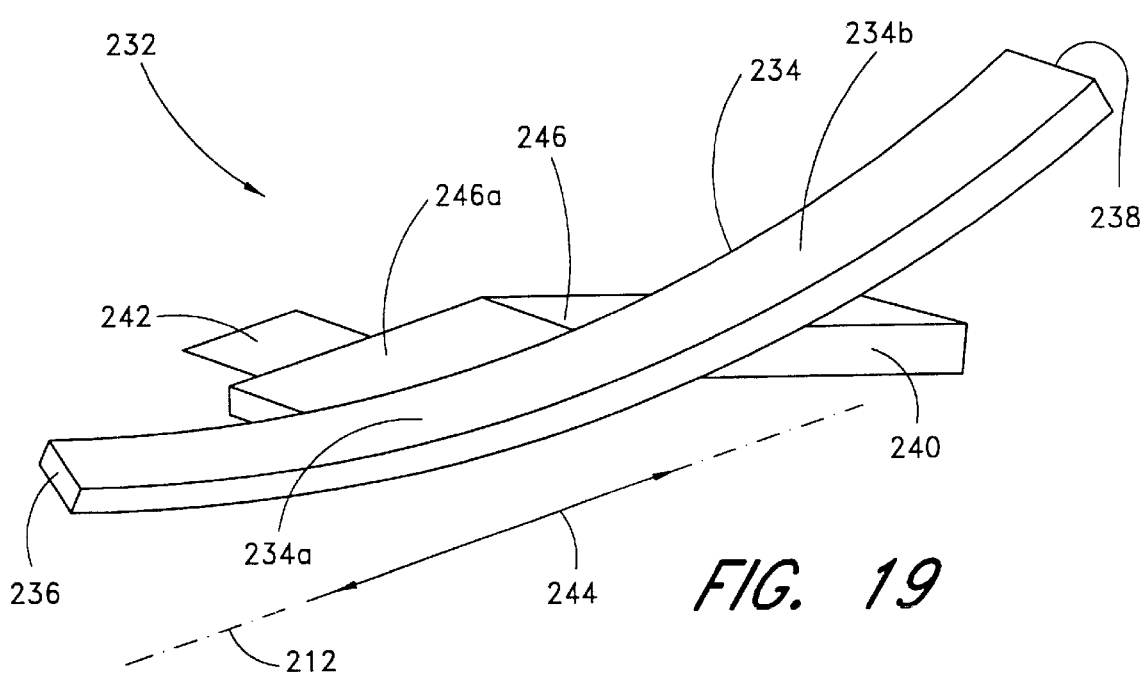
FIG. 19 shows an embodiment of a latch element.

Referring to the latch mechanism, FIG. 19 shows a latch element 232 that cooperates with the projection 218 to retain the sensor module 200 in the retracted position. The projection 218 moves generally along the longitudinal axis 212, backwards and forwards as indicated through a double arrow 244. The latch element 232 is located in a recess within the rail 224, whereby the recess is located in proximity of the transverse side 217 shown in FIG. 17. The latch element 232 includes a tap 242 to mount and secure the latch element 232 within the recess.

The latch element 232 has a proximal end 236 that faces the transverse side 217, and a distal end 238 that faces away from the transverse side 217. The latch element 232 has two elongate members 234, 246 which extend in parallel along the longitudinal axis 212. An end section 246a. of the member 246 is connected to a middle section 234a of the member 234 and to the tap 242. A front section of the member 246 extends downward and forms a prong 240. A section 234b of the member 234, between the middle section 234a and the distal end 238, extends upwardly. The section 234b and the prong 240 form a crux that receives the projection 218 in the retracted position.

The latch element 232 may be stamped or cut out from sheet metal and formed to create the crux. The sheet metal may be brass, spring steel, or any other suitable metal. In another embodiment, the latch element 232 may be a molded plastic element.

FIGS. 20A–20G illustrate the operation of the latch mechanism. The figures show the latch element 232 mounted in a recess 252 and a hook 230 and its projection 218 moving backwards and forwards (double arrow 244) within the recess 252. The recess 252 includes at a rear end a tooth 250 that extends in direction of the transverse side 217. The hook 230 is secured to the guide element 203 (e.g., FIG. 17). FIGS. 20A–20D show how the movable part 201 is placed from the exposed position to the retracted position, and FIGS. 20E–20H show how the movable part 201 is released from the retracted position.

Figure 20A:
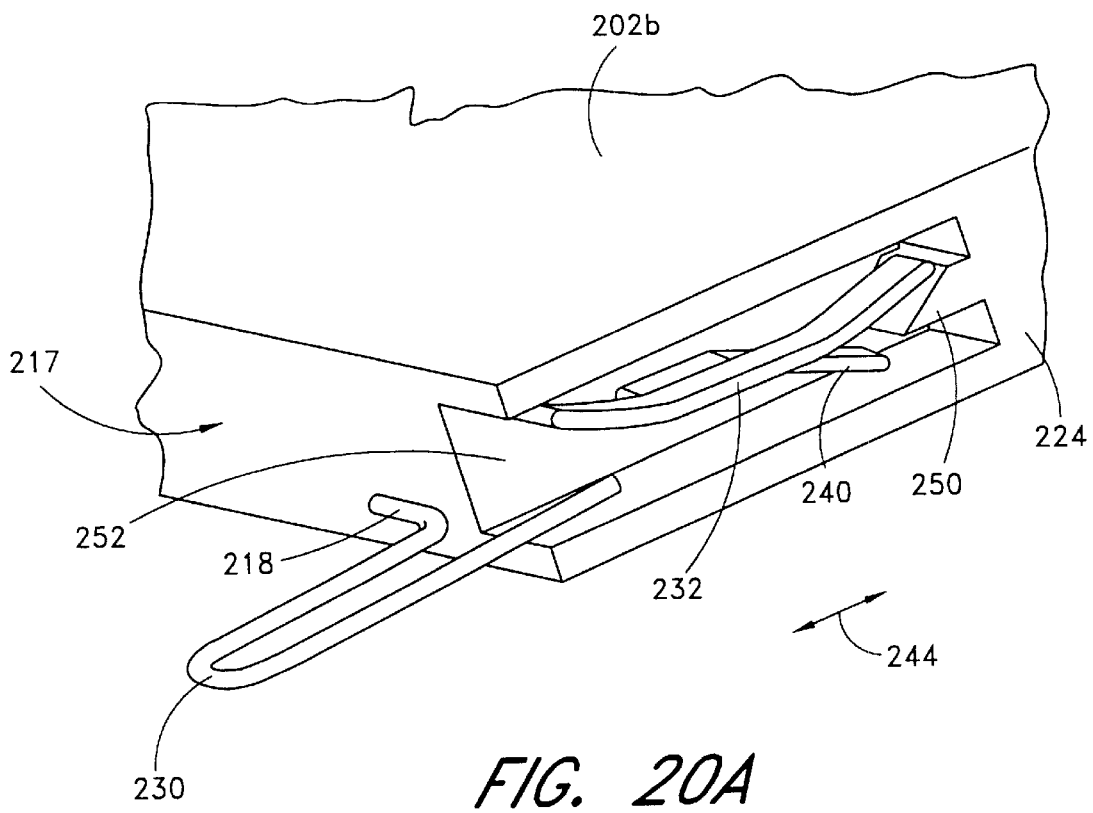
FIGS. 20A-20H illustrate the operation of a latch mechanism.
Figure 20B:
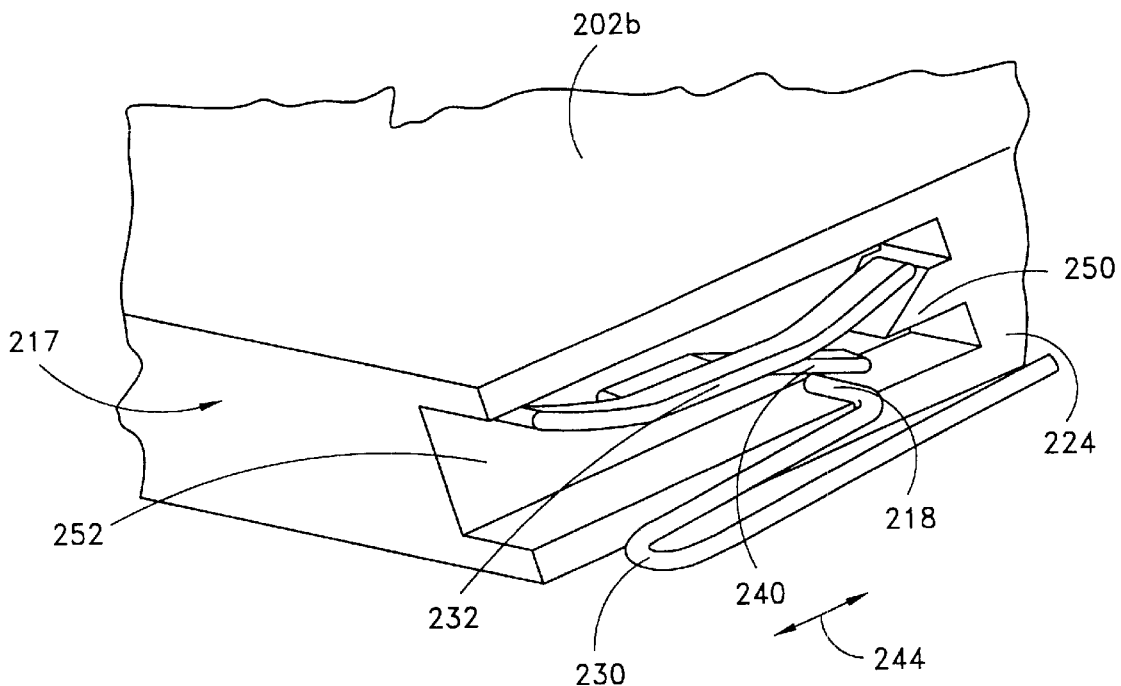

In FIGS. 20A, 20B, the projection 218 slides into the recess 232, glides along the element 234 which forces the projection 218 downwards. At about the end of the middle section 234a, the element 246 takes over guiding the projection 218 and forces the projection 218 further downwards until the end of the prong 240 as shown in FIG. 20B.

Figure 20C:
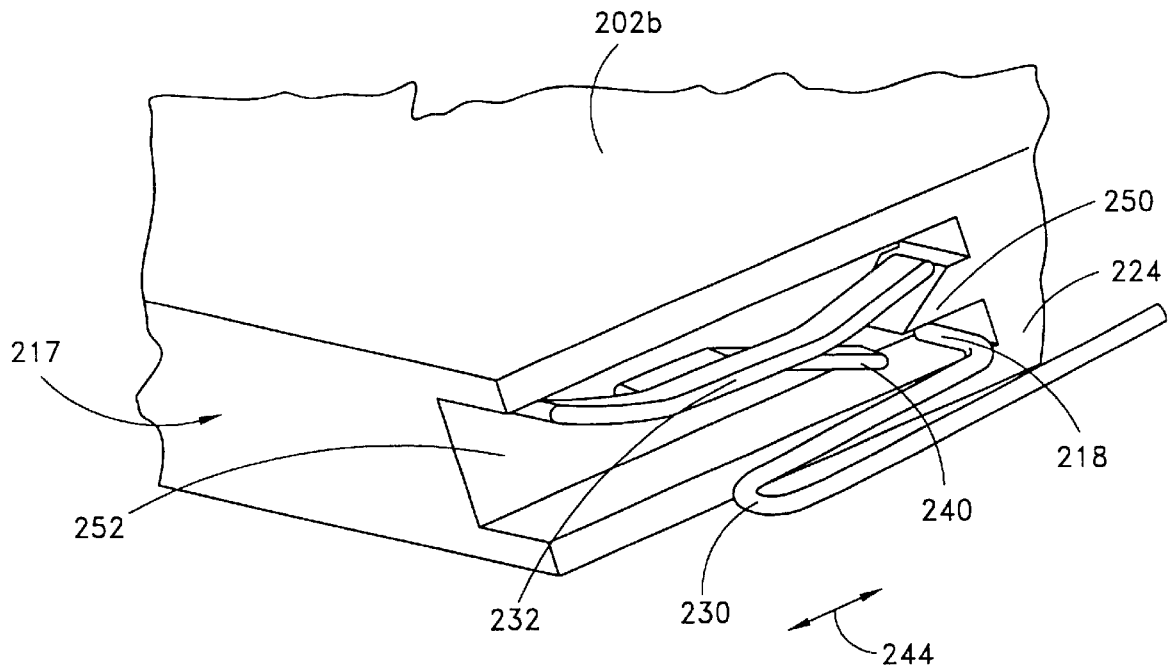
Figure 20D:
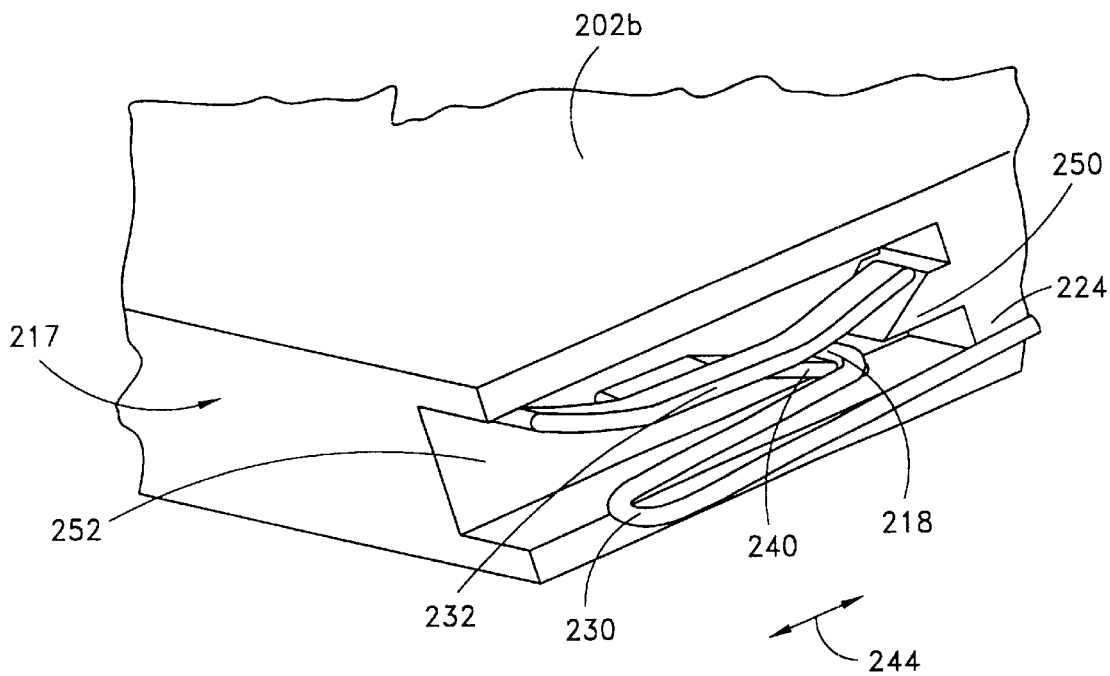

In FIGS. 20C, 20D, as the projection 218 is pushed further inside, the projection 218 snaps passed the prong 240 into the rear end of the recess 252. However, as the movable part 200 is spring-biased, the projection 218 does not remain in the rear end, but the spring 220 urges the movable part 200 and thus the projection 218 towards the front end of the recess 252. As the projection 218 is higher than the tip of the prong 240, the prong 240 catches the projection 218 while being urged toward the front end. The projection 218, thus, becomes trapped between the prong 240 and the element 246 as shown in FIG. 20D, and the sensor module 200 is in the retracted position.

Figure 20E:
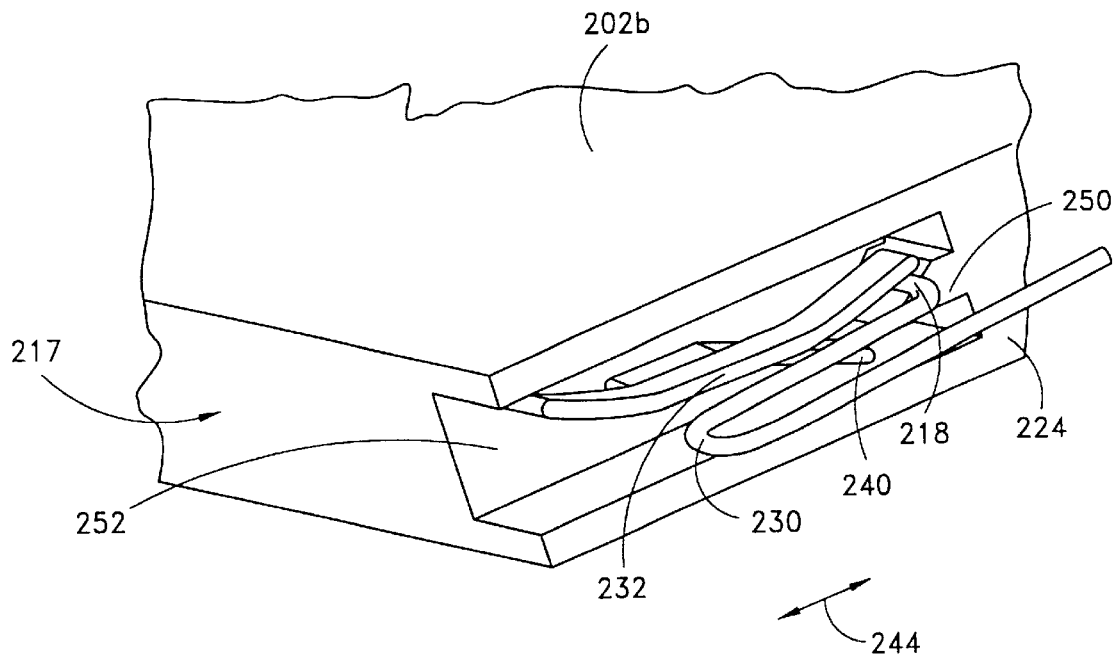
Figure 20F:
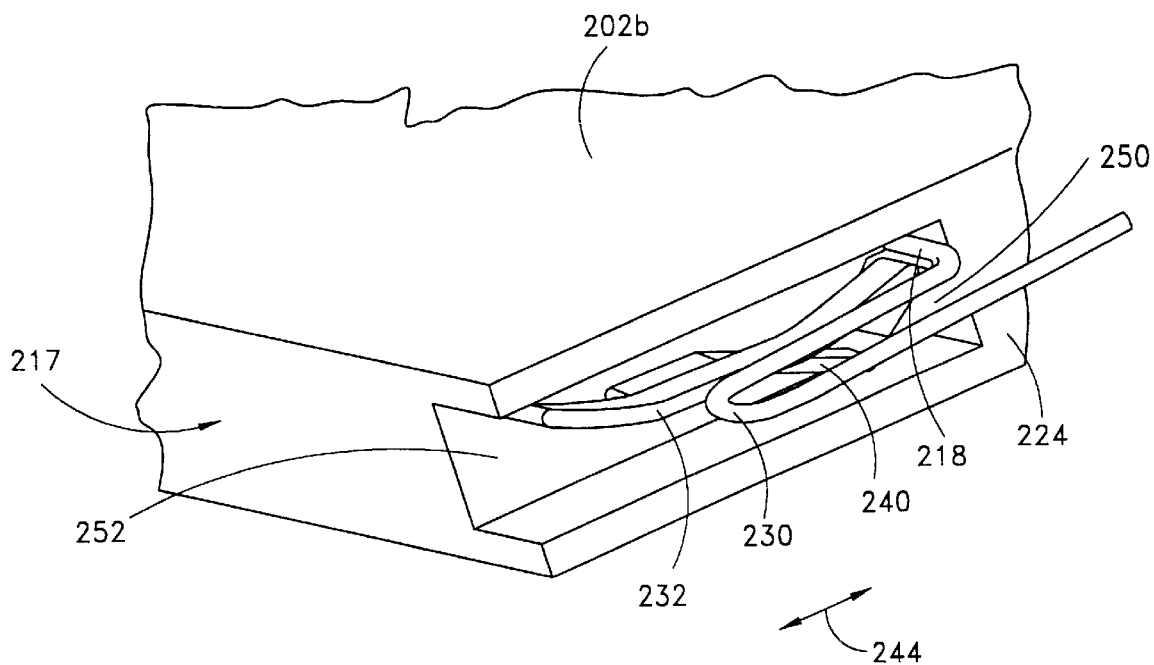

In FIG. 20E, the user pressed against the front end 7 of the sensor module 200 in order to release the sensor module 200 and place it in the active position. When the user presses against the front end 7, the projection 218 is urged inward toward the rear end of the recess 252. However, the tooth 250 guides the projection 218 upwards to an upper section of the recess 252. While gliding along an inclined surface of the tooth 250, the projection 218 urges the element 246 upwards. As shown in FIG. 20F, the projection 218 enters into the upper section at the rear end of the recess 252, and the element 246 snaps back.

Figure 20G:
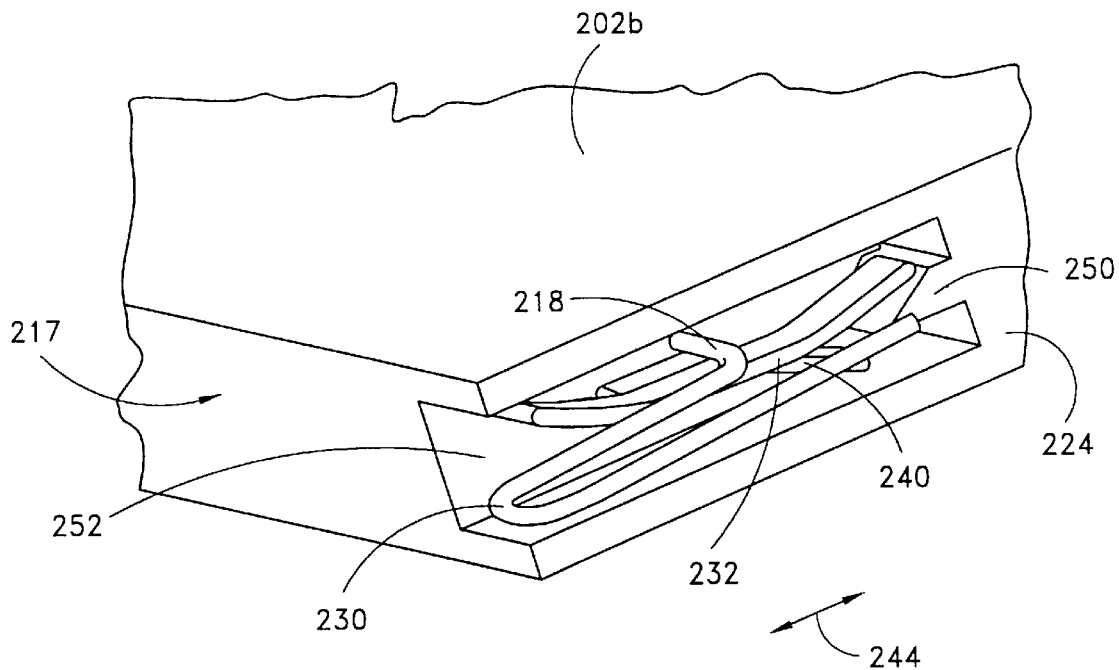
Figure 20H:
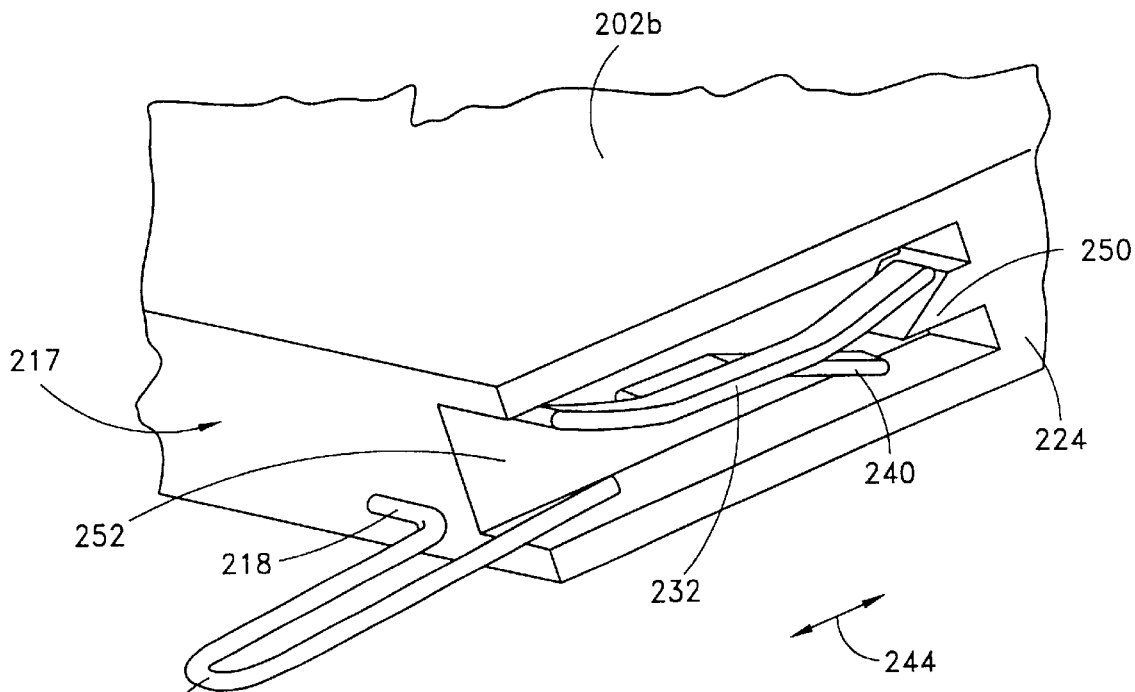

In FIG. 20G, the user stopped pressing against the sensor module 200 and the spring 220 (FIG. 19) pushes the sensor module 200 out. Because the element 246 snapped back, the projection moves from the rear upper section toward the traverse side 217 and is not caught in the crux formed by the prong 240 and the element 234 as shown in FIG. 20D. The sensor module 200 then rests in the active position as shown in FIG. 20H.

The latch mechanism is durable and reliable as it does not include moving or pivoting elements. Further, the latch element 232 can be molded in place during manufacture of the movable part 201.

Figure 21:
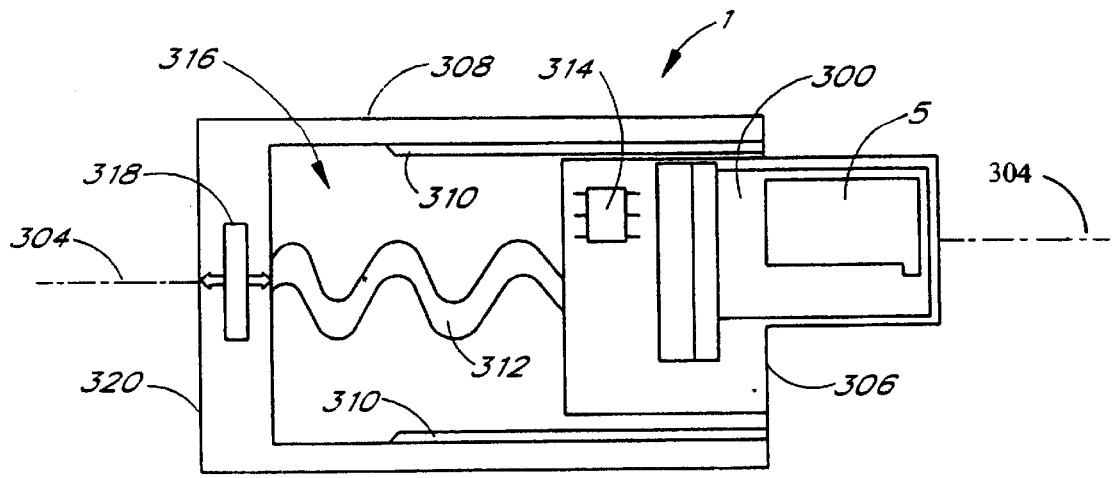
FIG. 21 shows a second embodiment of an interface card comprising a sensor.
Figure 22:
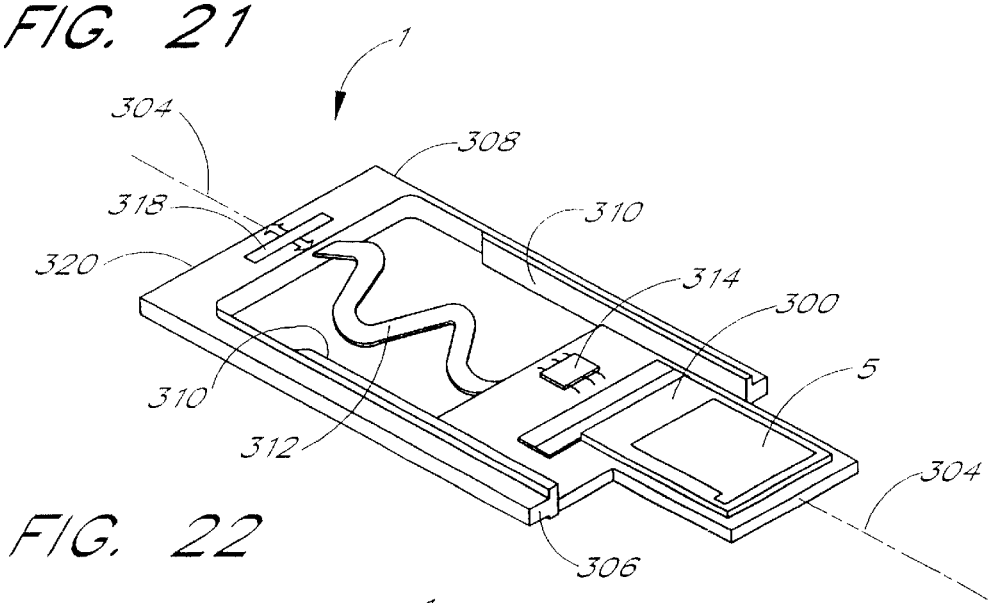
FIG. 22 shows a perspective view of the second embodiment of the interface card.

FIGS. 21 and 22 show a top view and an isometric view, respectively, of a further embodiment of the interface card 1. The housing of the interface card 1 is removed to illustrate the internal structure of the interface card 1 having a longitudinal axis 304. This embodiment of the interface card 1 includes also an sensor module 300 having an sensor 5 with an active area. The shape and size of the interface card 1 are as explained above with reference to FIG. 1. Furthermore, the active area is rectangular with its long sides extending along and parallel to the longitudinal axis 304.

The sensor module 300 is a one-piece arrangement that is movable within a frame 308, and comprises most of the electronic circuits of the interface card 1. For illustrative purposes, FIG. 21 shows the sensor module 300 as including an integrated circuit 314 representing the electrical circuits of the sensor module 2.

In the illustrated embodiment, the frame 308 is U-shaped (or C-shaped), and has an opening 316 within which the sensor module 2 is movable along the longitudinal axis 304 between the active position and the retracted position. On opposing internal sides of the U-shaped frame 308, the frame 308 comprises a pair of rails 310. Correspondingly, the sensor module 2 has complementary rails on lateral sides. The sensor module 2 glides along these rails 310 when it moves between the active and retracted positions. The interface card 1 has a front end 306 where the sensor module 300 moves in and out of the interface card 1.

At a rear end 320 of the interface card 1, the frame 308 comprises an interface 318 that provides for communications between the host system and the sensor module 300. A flexible cable 312 connects the interface 318 and the sensor module 300. In one embodiment, the sensor module 300 is spring-biased within the frame 308. Upon activation by the user, the sensor module 300 slides from the retracted position to the active position extending the flexible cable 312. Correspondingly, the user can press against the sensor module 300 to bring it back to the retracted position, and the flexible cable 312 folds back to its original position.

Figure 23:
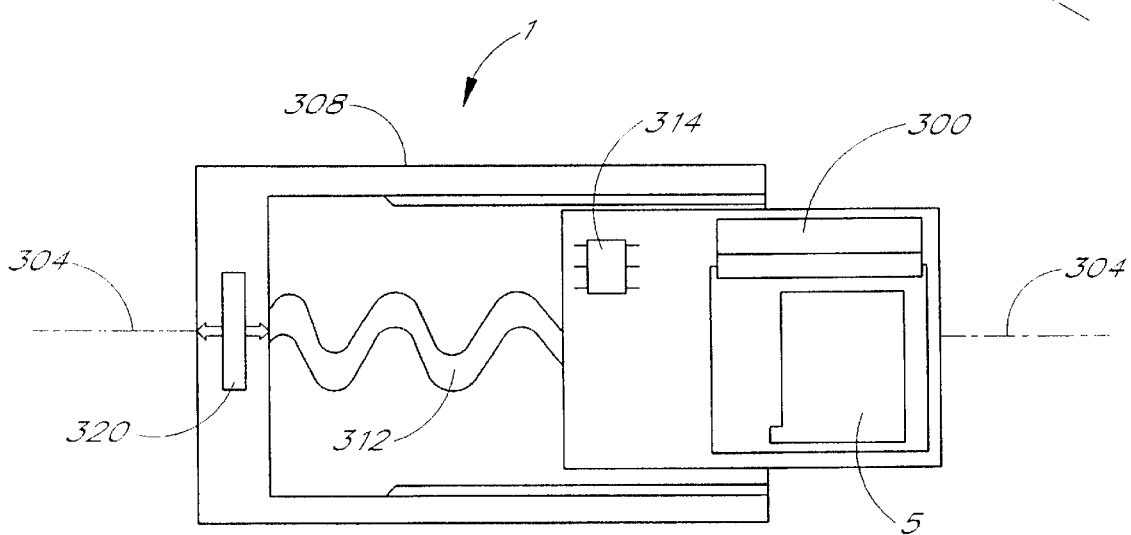
FIG. 23 shows a modification of the second embodiment.

FIG. 23 shows a variation of the interface card 1 shown in FIGS. 21, 22. Elements already shown in FIGS. 21, 22 have, thus, the same reference numerals. As shown in FIG. 23, the sensor 5 is rectangular and long sides extend perpendicular to the longitudinal axis 304.

In an alternative embodiment of the interface card 1, the portion of the sensor module that comprises the sensor 5 may be detachable mounted to the sensor module 2. When the interface card 1 is not in use, the user may detach the sensor 5 and store it, for example, at a corner of the interface card 1 within the periphery of the interface card 1. In addition, the sensor 5 may be easily replaced should the sensor 5 break or otherwise be damaged.

Figure 24:
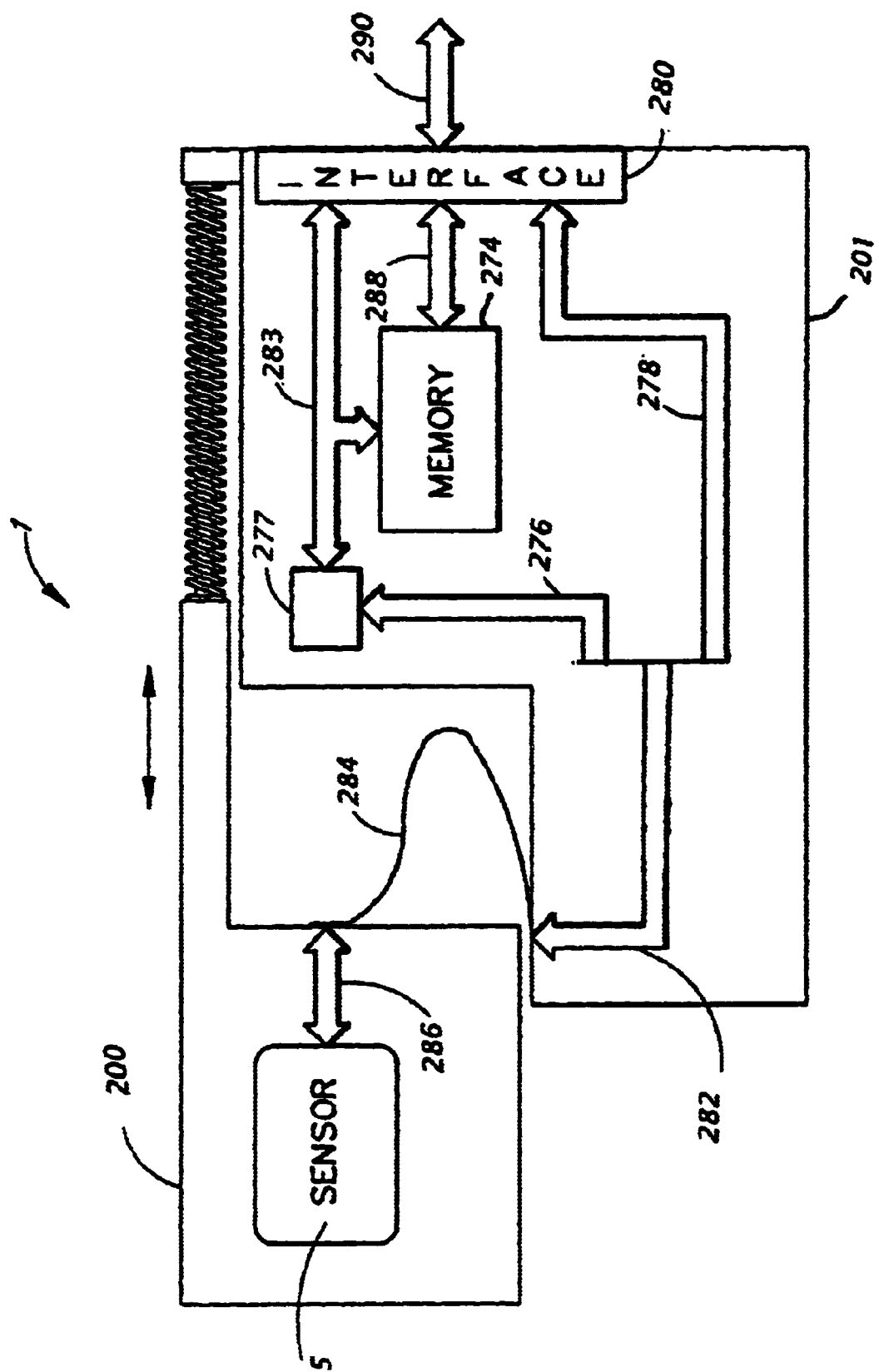
FIG. 24 shows block diagram of the second embodiment.

Referring to the second embodiment of the interface card 1 shown in FIGS. 17–20H and explained above, FIG. 24 shows an exemplary implementation of the electrical structure of the interface card 1 according to the second embodiment. Regarding the mechanical structure of the interface card 1, reference is made to the FIGS. 17–20H.

The sensor 5, which is represented through its active area, is located on the sensor module 200 (moving part 200), and selected electronic circuits of the interface card 1 are located on the fixed part 201. A cable 284 connects the sensor module 200 and the fixed part 201 and provides for communications between these two parts 200, 201. The fixed part 201 includes an interface 280 which provides for communications, via a bus 290, between the interface card 1 and the host system. In one embodiment, the moving part 200 further includes a drive/control circuit (not visible) located underneath the sensor 5. The drive/control circuit corresponds to the drive/control circuit 32 shown in FIG. 16 and described above.

The cable 284 is connected to a bus 282 on the fixed part 201 which splits into a bus 276 and a bus 278, and to a bus 286 on the sensor module 200. The bus 278 leads to the interface 280, and the bus 276 leads to a interface controller 277 which communicates with the host system to forward information from the sensor 5 to the host system, and to receive control information from the host system.

As illustrated, the fixed part 201 includes a memory device 274, which may be a non-volatile memory, and the interface controller 277 both of which are optional. It is contemplated that the interface card 1 is operable without the memory device 274 and the interface controller 277, and that in this case the drive/control circuit may directly and exclusively communicate with the host system. Generally, if a storage function is desired or necessary, the storage function of the memory device 274 may be implemented within the host system that comprises memory devices such as hard disks, CD-ROMs, and floppy disks. Similarly, the processing function of the interface controller 277 may be implemented within the host system, either in a central processor or a co-processor.

The memory device 274 is connected to the interface 280 via a bus 288, and the interface controller 277 also via the bus 283. The memory device 274 is connected to communicate with the host system via the bus 288 and the interface 280.

In one embodiment, the bus 276 has 16 connections and the bus 278 has 8 connections. The bus 282 therefore has 24 connections that lead to the sensor 5 and the drive/control circuit via the bus 284.

The memory device 274 is configured to retain its content even when a power supply is switched off. In one embodiment, the memory device 274 is an Electrically Erasable Programmable Read Only Memory (EEPROM). The EEPROM is a non-volatile storage device in which bytes or words can be erased and reprogrammed individually during system operation. Alternatively, any other non-volatile memory may be used.

In the illustrated embodiment, the memory device 274 stores an electronic representation (template) of the fingerprint of the authorized user. In another embodiment, the memory device 274 can store computer code in addition to the electronic representation of the fingerprint. The computer code can include code necessary to process the sensed fingerprint and to compare it with the stored template. In addition, the memory device 274 may be used to store sensitive private information which will only be released if the match is successful.

When a comparison of fingerprints needs to be executed, the host system (e.g., the laptop computer) can request a transfer of the computer code from the memory device 274 into a random access memory (RAM) of the host system. A processor of the host system can execute the computer code and perform the comparison of the fingerprints within the host system. It is contemplated that the memory device 274 may store the complete or only sections of the computer code necessary for the comparison procedure.

An advantage of this embodiment is that storing the necessary computer code in the memory device 274 on the interface card 1 is more secure than storing the computer code exclusively on a hard disk of the host computer. For instance, an unauthorized user (e.g., a thief) may be able to manipulate the host computer and by-pass a power-up or boot procedure during which the code stored on the hard disk is executed to authenticate the present user. If the thief is successful, he can use the computer in an unrestricted manner. If, however, the code is stored in the memory device 274, the authorized user can remove the interface card 1 and store it at a safe place when the computer is not in use. Without the interface card 1 and the code stored therein, the computer is completely inoperable.

During the boot procedure, the host system accesses the memory device 274 and reads the electronic representation of the authorized user's fingerprint. As described above, the host system compares the fingerprint representation of the present user with the fingerprint representation of the authorized user. If the two representations match, the present user is identified as the authorized user and a secured operating system, e.g., Windows NT, or the BIOS continue with the boot process.

When the interface card 1 includes a micro processor an additional advantage exists. The processor may be configured to perform the fingerprint comparison completely within the interface card 1. In this case, the stored fingerprint does not leave the interface card 1 which increases the security of the interface card 1 and improves the privacy of the user. The user may feel more comfortable knowing that his personal data is processed in the interface card 1. After execution of the comparison procedure, the interface card 1 generates a signal indicative of the result of the comparison procedure. If the stored fingerprint and the sensed fingerprint do not match, the signal, for example, does not enable operation of the host system.

It is contemplated that the various embodiments of the interface card 1 have similar electronic characteristics. The electronic characteristics may provide for off-card or on-card extraction and matching of the present fingerprint. Similarly, each embodiment may have the sensor 5 as described with reference to FIGS. 11–14. That is, the embodiments of the interface card 1 may include the sensor that has in one embodiment the primary and secondary sensors 45, 54. The drive/control circuit 32, 232 may also equally be used in the various mechanical embodiments.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A system, comprising:
   a host system; and
   an interface card compatible with the host system, the interface card having a housing and a sensor movably interconnected with the housing, the sensor having a first position in which the sensor receives an input and generates an electronic representation of the input, and a second position in which the sensor is inactive.

2. The system of claim 1, wherein the host system is a computer having a port to connect to the interface card.

3. The system of claim 1, wherein the host system is a portable computer having a slot to receive the interface card.

4. The system of claim 1, wherein the host system is security system configured to receive the interface card at an access-restricted location.

5. The system of claim 1, wherein the host system is a computer network configured to receive the interface card.

6. The system of claim 1, wherein the sensor is a fingerprint sensor.

7. The system of claim 1, wherein the sensor is a relief object image generator.

8. The system of claim 1, wherein the interface card has a shape and size that correspond to a shape and a size of a PCMCIA card.

9. A method of obtaining data relating to a relief object, comprising:
   inserting an interface card into a reception port of a host system, the interface card having a sensor movably connected within the interface card;
   exposing the sensor so that a relief object can be placed on the sensor; and
   generating an electronic representation of the relief object located on the sensor and processing of the electronic representation.

10. A method of obtaining data relating to a relief object, comprising:

inserting an interface card into a reception port of a host system, the interface card having a sensor removably connected within the interface card;

exposing the sensor so that a relief object can be placed on the sensor;

generating an electronic representation of the relief object located on the sensor and processing of the electronic representation; and moving the sensor back into an inactive position.

11. A method of obtaining data relating to a relief object, comprising:

inserting an interface card into a reception port of a host system, the interface card having a sensor removably connected within the interface card;

exposing the sensor so that a relief object can be placed on the sensor;

generating an electronic representation of the relief object located on the sensor and processing of the electronic representation; and moving the sensor back into an inactive position;

wherein the sensor is a fingerprint sensor and the relief object is a finger of a user.

12. A method of obtaining data relating to a fingerprint, comprising:

inserting a PCMCIA card into a reception port of a computer, the PCMCIA card having a fingerprint sensor movably connected within the PCMCIA card;

A exposing the fingerprint sensor so that a finger can be placed on the fingerprint sensor; and generating an electronic representation of the fingerprint located on the fingerprint sensor and processing of the electronic representation.

13. The method of claim 12, further comprising pressing against a side of the PCMCIA to cause the fingerprint sensor to slide into an exposed position in which the finger can be placed.

14. The method of claim 12, further comprising pressing against the fingerprint sensor to cause the fingerprint sensor to slide from an exposed position into a retracted position within the PCMCIA card.

15. The method of claim 12, further comprising matching the electronic representation of the fingerprint to a previously stored electronic representation of an authorized user.

16. A PCMCIA card, comprising:

a housing sized to be inserted into a reception port of a computer, the housing having an upper rectangular surface and a lower rectangular surface spaced apart from the upper surface, the upper and lower surfaces extending along a longitudinal axis; and a retractable fingerprint sensor coupled to the housing and configured to generate an electronic representation of a user's fingerprint, the fingerprint sensor sliding out from between the upper and lower surfaces when a user presses against a side of the PCMCIA card.

17. The PCMCIA card of claim 16, wherein the fingerprint sensor is configured to have an exposed position in which the fingerprint sensor receives a finger of the user.

18. The PCMCIA card of claim 16, wherein the fingerprint sensor is configured to slide into a retracted position when the user presses against a side of the fingerprint sensor, wherein the fingerprint sensor in the retracted position is substantially located within the housing.

* * * * *